(12) United States Patent
Vetsuypens et al.

(10) Patent No.: US 12,164,218 B2
(45) Date of Patent: Dec. 10, 2024

(54) METHOD AND SYSTEM FOR COLOR POINT CALIBRATION OF LIGHT SOURCE PROJECTOR

(71) Applicant: BARCO N.V., Kortrijk (BE)

(72) Inventors: Arnout Robert Leontine Vetsuypens, Ostend (BE); Peter Eric Rita Janssens, Nazareth (BE)

(73) Assignee: BARCO N.V., Kortrijk (BE)

( * ) Notice: Subject to any disclaimer, the term of this patent is extended or adjusted under 35 U.S.C. 154(b) by 327 days.

(21) Appl. No.: 17/615,015

(22) PCT Filed: Jun. 2, 2020

(86) PCT No.: PCT/EP2020/065246
§ 371 (c)(1),
(2) Date: Nov. 29, 2021

(87) PCT Pub. No.: WO2020/240047
PCT Pub. Date: Dec. 3, 2020

(65) Prior Publication Data
US 2022/0229355 A1    Jul. 21, 2022

(30) Foreign Application Priority Data

May 31, 2019  (WO) ................. PCT/EP2019/064245
Jun. 6, 2019   (GB) ..................................... 1908117

(51) Int. Cl.
*G03B 21/20*    (2006.01)
*H05B 47/14*    (2020.01)

(52) U.S. Cl.
CPC ....... *G03B 21/206* (2013.01); *G03B 21/2013* (2013.01); *G03B 21/204* (2013.01); *H05B 47/14* (2020.01)

(58) Field of Classification Search
CPC .............. G03B 21/206; G03B 21/2013; G03B 21/204; H05B 47/14
USPC ........................................................ 353/52
See application file for complete search history.

(56) References Cited

U.S. PATENT DOCUMENTS

| | | |
|---|---|---|
| 8,382,287 B2 | 2/2013 | Keh |
| 8,605,764 B1 | 12/2013 | Rothaar et al. |
| 2003/0179211 A1 | 9/2003 | Wada et al. |

(Continued)

FOREIGN PATENT DOCUMENTS

| | | |
|---|---|---|
| CN | 1447217 A | 10/2003 |
| CN | 101738831 A | 6/2010 |

OTHER PUBLICATIONS

International Search Report and Written Opinion issued in PCT/EP2020/065246, dated Oct. 1, 2020.

(Continued)

*Primary Examiner* — Jerry L Brooks
(74) *Attorney, Agent, or Firm* — HSML P.C.

(57) ABSTRACT

The present invention relates to image projection and provides a method and system for performing color calibration of light sources and correction towards a color target, for example a whitepoint target. The calibration and correction considers the ambient temperature and that the projector output has an arbitrary dimming level. The correction can be made automatic and can be performed by an operator in the field by pressing a button.

20 Claims, 11 Drawing Sheets

(56) References Cited

U.S. PATENT DOCUMENTS

| | | | |
|---|---|---|---|
| 2007/0103646 A1* | 5/2007 | Young | G03B 21/2033 353/69 |
| 2012/0062849 A1 | 3/2012 | Kuo et al. | |
| 2014/0035465 A1 | 2/2014 | Raj et al. | |
| 2014/0118424 A1 | 5/2014 | Young et al. | |
| 2015/0380898 A1 | 12/2015 | Okamoto et al. | |

OTHER PUBLICATIONS

International Search Report and Written Opinion issued in PCT/EP2019/064245, dated Feb. 28, 2020.

Office Action issued in Chinese Application No. 202080053419.7, dated Jul. 22, 2023, with English translation.

* cited by examiner

METHOD AND SYSTEM FOR COLOR POINT CALIBRATION OF LIGHT SOURCE PROJECTOR

The present invention relates to image projection systems and methods and provides a method and a system for performing color calibration of light sources and correction towards a color target, for example a whitepoint target.

BACKGROUND

The present invention relates to imaging projectors comprising laser light sources and how to control the currents that drive the laser light sources so that the whitepoint of outputted white light is kept within a desired specification.

The projection technology industry has moved away from traditional analog projection towards digital projection. In addition, conventional xenon lamps have been replaced by laser light sources or laser sources, leading to improvements of color gamut, lifetime, serviceability and total cost of ownership.

However, one of the main challenges of laser sources is the color calibration. For example, in high-end markets there are industry standards, e.g. DCI compliancy, which put requirements on the projector's performance, for example its whitepoint chromaticity. It is desired to attain the highest possible light output in any situation while being compliant. While conventional lamp technology is less temperature sensitive, a laser projector can comprise a multiple of laser sources. The output of different types of laser sources can respond differently to temperature variations, and, hence, each light source would need individual adjustment.

In order to reduce cost, it is desirable to avoid costly dynamic temperature control solutions such as e.g. chillers, and instead use more passive systems, e.g. radiators in combination with peltier coolers. Such systems may reduce the temperature stability when placed in a fluctuating ambient temperature. Hence, the ambient temperature can have a larger impact on systems having laser sources than for systems with conventional lamp technology, when using the same cost-efficient cooling solutions.

Due to lowered monetary costs, the market share of projectors having RGB laser sources is expected to grow, expanding its reach from the ultra-premium to further market segments.

SUMMARY OF THE INVENTION

Embodiments of the present invention provide image projection systems and methods, for example a method and a system having an object to perform color calibration of light sources and correction towards a color target. The color target can be for example a whitepoint target. The calibration and correction methods and systems provided by embodiments of the present invention, can be adapted to consider the ambient temperature and that the projector output has an arbitrary dimming level. The correction can be made automatically and can be performed by an operator in the field by a simple user action such as pressing a button.

A light source which can be provided for use in a projector can comprise a "laser light source" which can comprise on or a multiple of laser light emitting devices of the same color or wavelength or wavelength band. Alternatively, the laser light source can comprise a wavelength conversion element, such as a phosphor. The wavelength conversion element is configured to emit light at a plurality of wavelengths after absorption of a light beam from at least one of the lasers at an excitation wavelength. The light generated by (or by groups of) lasers (or laser banks), can refer to eventual light emitted by the projector, that is after conversion by the wavelength conversion element.

A configuration of a light source comprising a wavelength conversion element, can consist of or comprise a number of blue lasers, part of which provides direct blue light, which does not reach the wavelength conversion element, and part of which reaches the wavelength conversion element, where it is converted into yellow light, for example. Alternatively, there can be two types of wavelength conversion elements, one which converts blue impinging laser light into green light and one which converts blue impinging laser light into red light; or a wavelength conversion element (which can generate green or yellow light from impinging blue light) with two types of lasers with distinct emission bands, for instance red and blue lasers.

Hence, embodiments of the present invention can include light sources comprising wavelength conversion materials such as phosphors or quantum dots. In some embodiments the light sources can comprise only two generated colors such as primary colors, for instance when using a combination of direct laser light such as direct blue laser light and wavelength converted light such as phosphor converted light. A wavelength conversion element such as a phosphor can produce yellow light, e.g. when excited by a blue laser light. In this case, reaching the desired whitepoint may be difficult, but the blue and yellow light can be properly balanced to approximate the desired whitepoint. In any of the embodiments of the present invention the laser light source for supplying direct blue laser light does not need to be the same as blue laser light used to excite the wavelength conversion element.

In one aspect, embodiments of the present invention provides a method for correcting driving currents to reach a color point target for a multiple of primary colour light sources in an imaging system having a light source controller, the method comprising the steps of Defining a color point target, Obtaining a measured temperature, Obtaining tristimulus values of the light from the primary light sources, Providing initial driving current values of the light sources, valid for a reference temperature, to the light source controller, for each of the light sources:

calculating driving current values for the light sources that yield a known output function of at least one of the obtained tristimulus values for the reference temperature, adapting the driving current values based on the difference between the measured temperature and the reference temperature, correcting the driving current values with alpha factors, the alpha factors being the dimming levels for each light source for reaching the color point target, and which depend on a relation between the obtained tristimulus values and the color point target, and the known output function of one of the tristimulus values, and applying corrected driving current values to the primary light sources.

Embodiments of the present invention provide a method for correcting driving currents to reach a color point target for a multiple of primary colour light sources in an imaging system having a light source controller, the method comprising the steps of defining a color point target which can be a whitepoint,
obtaining a measured temperature,
obtaining tristimulus values of the light from the primary light sources,
providing initial driving current values of the light sources, valid for a reference temperature, to the light source controller,
for each of the light sources:
obtaining current conversion values between incoming laser driving currents and outgoing laser driving currents; the light sources receiving the outgoing laser driving currents,
calculating amended driving current values for the light sources based on the incoming driving current values, that yield a known behavior of at least one of the obtained tristimulus values for the reference temperature,
adapting the amended driving current values based on the difference between the measured temperature and the reference temperature,
correcting the adapted driving current values with alpha factors, the alpha factors being the dimming levels for each light source for reaching the color point target, and which depend on a relation between the obtained tristimulus values and the color point target, and the known output function of one of the tristimulus values,
and applying corrected driving current values to the primary light sources.

The calculation of driving current conversion values relates to the conversion of an incoming laser driving current to an outgoing laser driving current, which outgoing laser driving current is then applied to a laser light source, ensuring a certain mathematical relation, for instance a linear relation, between the incoming laser driving current, and at least one of the obtained tristimulus values. This is done at the reference temperature.

The incoming laser driving current can be linked to a means for setting the desired relative light output value or diming value, such as a slider, which is configured to set a desired relative light output value or dimming level between 0, 5, 15 or 30% and 100%.

The outgoing driving current values are adapted based on the difference between the measured temperature and the reference temperature, and the outgoing driving current values are corrected with alpha factors, the alpha factors being the dimming levels for each light source for reaching the color point target which can be a white point.

The above methods can be used with at least one light source comprising direct laser light such as blue laser light and a wavelength conversion element such as a laser excited phosphor light source. The excitation may be generated by incident blue laser light. In any of the embodiments of the present invention the laser light source for supplying direct blue laser light does not need to be the same as blue laser light used to excite the wavelength conversion element.

A possible configuration of a light source comprising a wavelength conversion element, can consist of a number of blue lasers, part of which generating direct blue light, which does not reach the wavelength conversion element, and part of which reaches the wavelength conversion element, where it is converted into yellow light. Alternatively, there can be two types of wavelength conversion elements, one which converts blue impinging laser light into green light and one which converts blue impinging laser light into red light; or a wavelength conversion element (which can generate green or yellow light from impinging blue light) with two types of lasers with distinct emission bands, for instance red and blue lasers.

Embodiments of the present invention can include wavelength conversion materials such as phosphors or quantum dots. In some embodiments the light sources can comprise only two generated colors such as primary colors, for instance when using a combination of direct laser light such as direct blue laser light and wavelength converted light such as phosphor converted light. A wavelength conversion element such as a phosphor can produce yellow light, e.g. when excited by a blue laser light. In this case, reaching the desired whitepoint may be difficult, but the blue and yellow light can be properly balanced to approximate the desired color point such as the desired whitepoint.

When using light sources having wavelength conversion elements (such as phosphors) which are excited by laser light such as blue laser light, the way the laser banks are enabled/switched to be measured is different than for direct laser light.

In the method described above the laser banks can be gauged by enabling the laser bank under test, and disabling others, i.e. the step: at least one has been fulfilled, the laser bank is enabled to be measured.

This preparation for measuring a specific laser bank can be done by enabling the specific laser bank to be measured and disabling all the other laser banks, such that only the specific laser bank is emitting light and being measured.

In the case of light sources with a laser and a laser excited wavelength conversion material such as used in laser phosphor projectors, blue lasers can be used to generate direct blue light, and other blue lasers can be used to generate yellow light from the wavelength conversion elements. Additionally, red lasers can be used to improve the saturation of the red primary.

With respect to the calibration methods described above, the processing is different for the laser banks which have excitation of a wavelength conversion element such as phosphor or a quantum dot, compared with the laser banks which are generating direct laser light. In the case of lasers generating direct laser light, the above method can be used to prepare a bank and to measure the bank. For the banks generating phosphor light, a method as described below can be used:

For each driving setting, a reference measurement is taken, by enabling all lasers.

For each laser bank which uses a wavelength conversion element to generate phosphor light from a laser, each bank is measured sequentially, by performing a measurement while this laser bank is disabled and the other laser banks are still enabled.

The contribution for each bank is than obtained by calculating the differences between the reference measurement, and the measurements per disabled bank.

The obtained contributions per laser bank are then preferably scaled, such that the sum of the contributions of all laser banks is equal to the reference measurement.

This alternative method for the phosphor based laser light sources deals with non-linearty of the wavelength conversion elements such as phosphars. At higher impinging blue laser light levels, a relatively lower amount of light is wavelength converted, compared to what is obtained by lower impinging blue light levels. By disabling single banks, the contribution of that particular bank is properly assessed at the corresponding phosphor operating regime.

The use of at least one light source with a wavelength conversion element requires a change in how the alpha factors are used in the above method.

For an RGB projector with direct laser light in the three primary colours RGB, the red, green and blue primaries can be individually controlled to reach a destination whitepoint by controlling the individual laser light sources.

For a phosphor based projector, the red primary can be composed of red phosphor light obtained from a wavelength conversion element or phosphor, as well as direct red laser light from a red laser, to reach a saturation of red. So, when changing brightness the wavelength conversion elements (such as a phosphor or quantum dot) and laser red light should be driven proportionally, in order to maintain the red saturation. The blue/yellow balance can improved, by taking into consideration that the desired whitepoint should not be reached. Instead, by doing a combination of alpha factor correction and electronic correction at the spatial light modulator (DMD) level, the target whitepoint can be reached with minimal compromises. This combination is done by calculating the required correction on the red green and blue primaries, and by applying the minimum correction of red and green to the lasers generating yellow and red light. The required correction for blue can be applied directly. The remaining correction can be done by the electronic spatial light modulator (DMD) correction.

If there is bleed through on the phosphor based light sources, e.g. some blue light bleeds through the phosphors, the driving of the blue lasers will need to adapted suitably, to cope with this effect. Quantum dots may be used as the wavelength conversion element and quantum dots can allow bleeding of the excitation light such as blue laser light through the quantum dots without conversion of the blue laser light. The total blue light generated as the blue primary will partially comprise or consist of blue light supplied directly by blue lasers, and partially of light which is directed towards the phosphor, but which bleeds through, and, hence, will stay blue light and contributes to the blue primary.

The lasers with wavelength conversion elements which partially generate yellow light, need to be calibrated such that the phosphor light from the wavelength conversion elements is linearized over dimming levels. As the wavelength conversion element such as a phosphor can or does behave non-linearly, this implies that the resulting bleeding of blue non-converted laser light is non-linear over dimming levels. By suitably determining the driving of the other blue lasers, which are not directed to the wavelength conversion element such as a phosphor, this non-linearity can be compensated for, such that the complete blue light generated by all lasers does behave linearly over dimming.

The dependent method claims each disclose a further individual embodiment of the present invention.

Embodiments of the present invention provide a factory calibration, or an in field calibration method and system.

A system is provided in accordance with an embodiment of the present invention for correcting driving currents to reach a color point target for a multiple of primary colour light sources in an imaging system having a light source controller, comprising Means for defining a color point target,
Means for receiving a measured temperature,
Means for receiving tristimulus values of the light from the primary light sources,
Means for providing initial driving current values of the light sources, valid for a reference temperature, to the light source controller, And for each of the light sources:
Means for calculating driving current values for the light sources that yield a known output function of at least one of the obtained tristimulus values for the reference temperature,
Means for adapting the driving current values based on the difference between the measured temperature and the reference temperature,
Means for correcting the driving current values with alpha factors, the alpha factors being the dimming levels for each light source for reaching the color point target,
and which depend on a relation between the obtained tristimulus values and the color point target, and the known output function of one of the tristimulus values,
and means for applying corrected driving current values to the primary light sources.

Embodiments of the present invention provide a system for correcting driving currents to reach a color point target for a multiple of primary colour light sources in an imaging system having a light source controller, comprising means for defining a color point target,
means for receiving a measured temperature,
means for receiving tristimulus values of the light from the primary light sources,
means for providing initial driving current values of the light sources, valid for a reference temperature, to the light source controller,
and for each of the light sources:
means for obtaining current conversion values between incoming laser driving currents and outgoing laser driving currents; the light sources being adapted to receive the outgoing laser driving currents,
means for calculating outgoing driving current values for the light sources based on the incoming driving current values, that yield a known behavior of at least one of the obtained tristimulus values for the reference temperature,
means for adapting the driving current values based on the difference between the measured temperature and the reference temperature,
means for correcting the driving current values with alpha factors, the alpha factors being the dimming levels for each light source for reaching the color point target,
and which depend on a relation between the obtained tristimulus values and the color point target, and the known output function of one of the tristimulus values,
and means for applying corrected driving current values to the primary light sources.

The above systems can comprise at least one light source comprising direct laser light such as a blue laser light and a wavelength conversion element such as a laser excited phosphor light source. The excitation may be generated by incident blue laser light. The excitating blue laser and the blue laser for direct projection need not be the same.

A configuration of a light source comprising a wavelength conversion element, can comprise or consist of a number of blue lasers, part of which generate direct blue light, which does not reach the wavelength conversion element, and part of which reaches the wavelength conversion element, where it is converted into yellow light. Alternatively, there can be two types of wavelength conversion elements, one which converts blue impinging laser light into green light and one which converts blue impinging laser light into red light; or a wavelength conversion element (which can generate green or yellow light from impinging blue light) with two types of lasers with distinct emission bands, for instance red and blue lasers.

Embodiments of the present invention can include wavelength conversion materials such as phosphors. In some embodiments the light sources can comprise only two generated colors such as primary colors, for instance when using a combination of direct laser light such as direct blue laser light and wavelength converted light such as phosphor converted light. A wavelength conversion element such as a phosphor can produce yellow light, e.g. when excited by a blue laser light. In this case, reaching the desired whitepoint may be difficult, but the blue and yellow light can be properly balanced to approximate the desired whitepoint.

When using light sources having wavelength conversion elements (such as phosphors) which are excited by laser light such as blue laser light, the way the laser banks are configured to be enabled/switched for measurement is different compared to that for projectors with direct projection of laser light.

In the system described above without wavelength conversion elements, the laser banks can be configured to be gauged by enabling the laser bank under test, and disabling all others, i.e. this includes the step: at least one has been fulfilled, the laser bank is enabled to be measured.

This preparation for measuring a specific laser bank is done by enabling the specific laser bank to be measured and disabling all the other laser banks, such that only the specific laser bank is enabled to emit light and to be measured.

In the case of light sources with laser excited wavelength conversion materials such as used in laser phosphor projectors, blue lasers can be used to generate direct blue light, and other blue lasers can be used to generate yellow light from the wavelength conversion elements. Additionally, red lasers can be used to improve the saturation of the red primary.

With respect to the calibration system described above, the system is configured to process the laser banks which have excitation of a wavelength conversion element such as phosphor in different ways, compared with the laser banks which are generating direct laser light. In the case of lasers generating direct laser light, the above system can be used in which one bank is driven and the others are switched off. For the banks generating phosphor light, these banks can be configured to operate with an amended method as described below.

The system is configured for each driving setting, to take a reference measurement by enabling all lasers.

For each laser bank which uses a wavelength conversion to generate phosphor light from a laser, the system is configured so that each bank is measured sequentially, by performing a measurement while this laser bank is disabled and all the other laser banks are still enabled.

The contribution for each bank is than obtained by the system being configured to calculate the differences between the reference measurement, and the measurements per disabled bank.

The obtained contributions per laser bank are then preferably scaled, such that the sum of the contributions of all laser banks is equal to the reference measurement.

This alternative system for the phosphor based laser light sources deals with non-linearity of the light source materials. At higher impinging blue laser light levels, a relatively lower amount of light is phosphor-converted, compared to what is obtained by lower impinging blue light levels. By disabling single banks, the contribution of that particular bank is properly assessed at the corresponding phosphor operating regime.

The system above has means for correcting driving current values with alpha factors. The use of at least one light source with a wavelength conversion element in a system as described above requires a change in how the system is configured to use alpha factors.

For an RGB projector with direct laser light in the three primary colours RGB, the red, green and blue primaries can be individually controllable to reach a destination whitepoint by controlling the individual laser light sources.

For a phosphor based projector, the red primary can be composed of red phosphor light obtained from a wavelength conversion element, as well as direct red laser light from a red laser, to reach a saturation of red. So, when changing brightness the wavelength conversion elements such as a phosphor and laser red light should be driven proportionally, in order to maintain the red saturation. The blue/yellow balance can improved, by taking into consideration that the desired whitepoint should not be reached. Instead, by doing a combination of alpha factor correction and electronic correction at the spatial light modulator (DMD) level, the target whitepoint can be reached with minimal compromises. This combination is done by calculating the required correction on the red green and blue primaries, and by applying the minimum correction of red and green to the lasers generating yellow and red light. The required correction for blue can be applied directly. The remaining correction can be done by the electronic spatial light modulator (DMD) correction.

If there is bleed through in the phosphor based light sources, e.g. some blue light bleeds through the phosphors, the driving of the blue lasers will need to adapted suitably, to cope with this effect. Quantum dots may be used as the wavelength conversion element and quantum dots can allow bleeding of the excitation light such as blue laser light through the quantum dots without conversion. The total blue light generated as the blue primary will partially comprise or consist of blue light generated directly by blue lasers, and partially of light which is directed towards the phosphor, but which bleeds through, and hence will contribute to the blue primary.

The lasers which partially generate yellow light, need to be calibrated such that the phosphor light is linearized over dimming levels. As the wavelength conversion element such as a phosphor can or does behave non-linearly, this implies that the resulting bleeding of blue non-converted laser light is non-linear over dimming levels. By suitably determining the driving of the other blue lasers, which are not directed to the phosphor, this non-linearity can be compensated for, such that the complete blue light generated by all lasers does behave linearly over dimming.

Means to control the current supplied to the system, are provided. The current supplied to the system can be called the incoming laser driving current. This current is set by a means for controlling the incoming laser drive current. The means for controlling can be a slider.

The light sources comprising laser can be or are non-linear with the current it receives or they receive. This current is called an outgoing laser driving current. Hence, the current that the light sources such as lasers receive is called the outgoing laser driving current.

The light sources comprising lasers provide tristimulus values.

The system is configured to provide a response (e.g. a linear) relationship between the settings of the means for controlling the input current e.g. slider settings which set the incoming laser driving current, and the tristimulus values.

Hence, current conversion values between the incoming laser driving current and the outgoing laser driving current are provided.

This includes therefore calculating outgoing driving current values for the light sources based on the incoming driving current values, that yield a known behavior of at least one of the obtained tristimulus values for the reference temperature.

The calculated driving current conversion values, which relate incoming laser driving current to outgoing laser driving current, are then applied to a laser light source, ensuring a certain mathematical relation, for instance a linear relation, between the incoming laser driving current, and at least one of the obtained tristimulus values. This is done for the reference temperature.

The incoming laser driving current can be linked to means for setting a desired relative light output value or dimming level between 0, 5, 15 or 30% and 100%. These means can be a slider, which is intended to set a desired relative light output value or dimming level between 0, 5, 15 or 30% and 100%.

Then the outgoing driving current values are adapted based on the difference between the measured temperature and the reference temperature.

Then a correction is applied to the outgoing driving current values with alpha factors, the alpha factors being the dimming levels for each light source for reaching the color point target.

For example, means for providing conversion values can be LUTs which in use can linearize the behavior of lasers or groups of lasers at a particular reference temperature. For other temperatures the values are calculated based on the values at the reference temperature. The combined effect of all LUTs can provide an input driving current to output driving current conversion and alter the projector's brightness, e.g. linearly, when altering the driving currents for the laser banks. The projector's target chromaticity or color point is also maintained. The input driving currents can be collectively altered, e.g. by a setting of the means for setting a desired relative light output value or dimming level between 0, 5, 15 or 30% and 100%. This setting of the means can be an input slider setting.

LUTs can be used for laser light source controllers to determine proper laser driving current for different brightness levels. The LUTs can be simple tables which relate incoming laser driving current to outgoing laser driving current, which are then applied to a laser light source, for example a laser bank. Each individual laser bank can have its own LUT and can be modulated individually. A goal is to adapt the behavior of the different laser banks, or groups of laser banks of the same color, by choosing the content of the LUTs, such that the output of the projector behaves linearly with the input value. By the output value XYZ the tristimulus values are meant, which can represent the brightness and chromaticity of the projector.

In practice, the input of the LUT can be linked to a setting of the means for setting a desired relative light output value or dimming level between 0, 5, 15 or 30% and 100%. These means can be slider, which is intended to set a desired relative light output value or dimming level between 0, 5, 15 or 30% and 100%. The output value of the LUT can be given as an input current value (or an input current value derived from the LUT value) to the laser light source. For example, this can be implemented so that 100% corresponds to a fixed maximum laser current which depends on the specific laser light source type.

The dependent method claims each disclose a further individual embodiment of the present invention as they comprise method steps which are functional features of the system. The dependent system claims each disclose a further individual embodiment of the present invention as they comprise features of the system. Embodiments of the present invention provide a factory calibration, and/or an in field calibration method and system.

Embodiments of the present invention provide a factory calibration, and/or an in field calibration method and system.

In another aspect of the invention is a computer program product comprising software is provided which when executed on a processor implements any of the methods of the present invention. A non-transitory machine readable signal storage means can be provided for storing the computer program product.

DEFINITIONS

Figure 1:
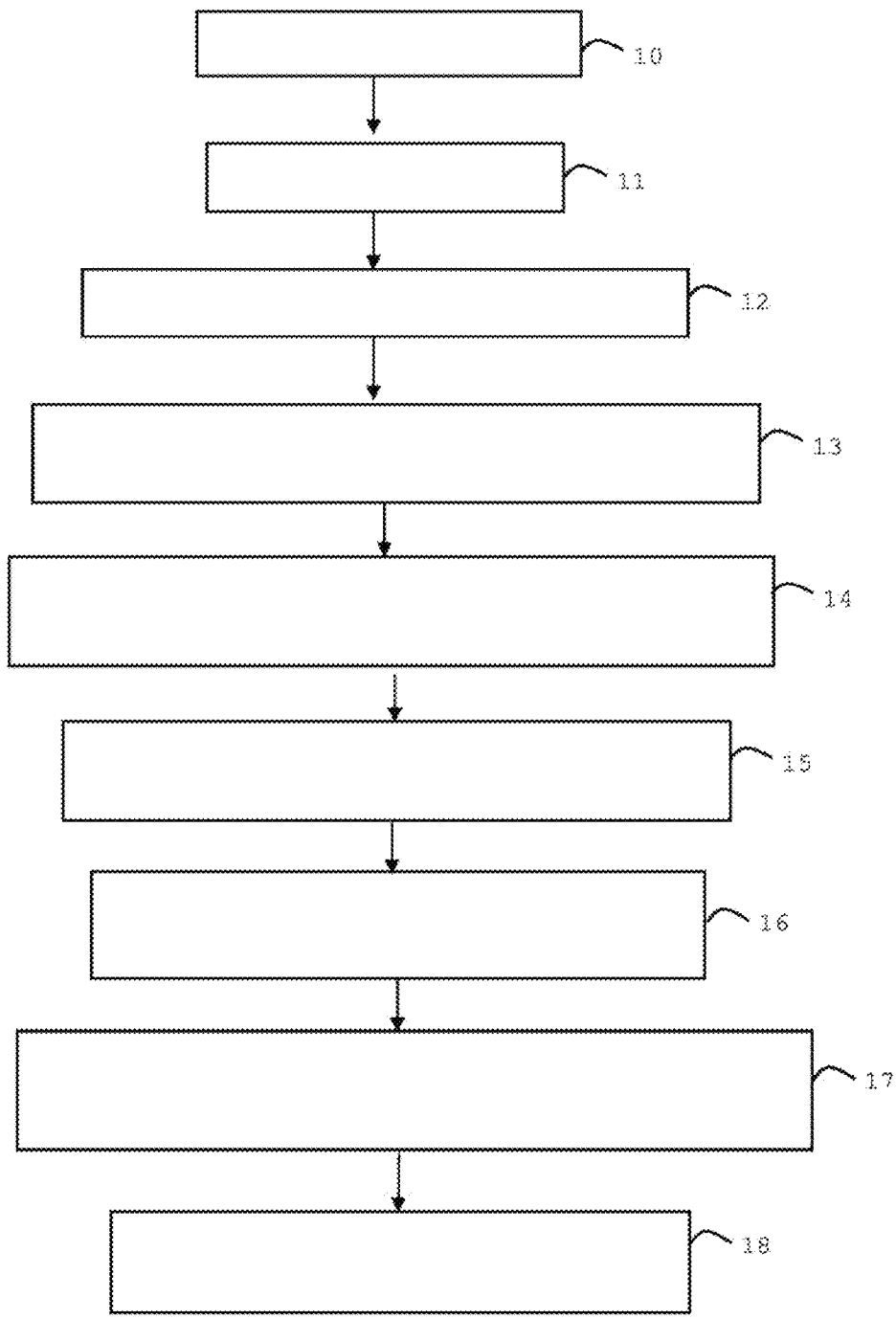
FIG. 1 shows a flow chart of an embodiment of the present invention comprising an initial calibration.

A "laser light source" can comprise a multiple of laser light emitting devices of the same color or wavelength or wavelength band. Alternatively, the laser light source can comprise a wavelength conversion element, such as a phosphor. The wavelength conversion element is configured to emit light at a plurality of wavelengths after absorption of a light beam from at least one of the lasers at an excitation wavelength. The light generated by (groups of) lasers (or laser banks), mentioned in the detailed descriptions can refer to eventual light emitted by the projector, so after conversion by the wavelength conversion element.

A possible configuration of a light source comprising a wavelength conversion element, can consist of a number of blue lasers, part of which generating direct blue light, which does not reach the wavelength conversion element, and part of which reaches the wavelength conversion element, where it is converted into yellow light. Alternatively, there can be 2 types of wavelength conversion elements, one which converts blue impinging laser light into green light and one which converts blue impinging laser light into red light; or a wavelength conversion element (which can generate green or yellow light from impinging blue light) with 2 types of lasers with distinct emission bands, for instance red and blue lasers.

Embodiments of the present invention can include wavelength conversion materials such as phosphors. In some embodiments the light sources can comprise only two generated colors such as primary colors, for instance when using a combination of direct laser light such as direct blue laser light and wavelength converted light such as phosphor converted light. A wavelength conversion element such as a phosphor can produce yellow light, e.g. when excited by a blue laser light. In this case, reaching the desired whitepoint may be difficult, but the blue and yellow light can be properly balanced to approximate the desired whitepoint.

A "laser bank" is a laser light source that comprise a multiple of light emitting diodes that are located on a common mechanical support and can share the power supply.

A "driving current" of a laser light source can be a current that is given as input to the laser light source in order to operate it. This current can be called the output current from a device which converts A "light source controller" or "laser driver module" is an electronic means for controlling the driving signal of a light source. The driving signal can be a current or a voltage. The light source can be a solid state light source, for example comprising laser diodes.

"White light" can be obtained by mixing light of different colors, for example the primary colors red, green and blue.

The "ambient temperature" is the temperature of the environment surrounding a system or device. The ambient temperature of a laser source relates to the temperature of the environment close to the laser source.

A "light sensor" can have one or more sensor elements that can detect light and transform them into a signal, for example a current or a voltage. Some light sensors can detect the chromaticity or color point of the light.

The "native response of a laser light source" can be non-linear, so that the output does not change in a predictable way with the provided driving current. It is possible to perform a current to current transformation, e.g. with a look-up table (LUT) and obtain "predicted driving current values", i.e. when the light output of the light sources or the projector can be a known function of the input values. In one embodiment such output can be linear with the input values so that the output signal $Y=a(x)+b$, where x are the input values. In one preferred embodiment the offset $b=0$.

A "laser light source controller" or a "light source controller" is an electronic means for controlling the driving signal of a light source. The driving signal can be a current or a voltage. The light source can be a solid state light source, for example comprising laser diodes.

A "dimming level" or "brightness level" can be given as a percentage of the maximum brightness level which is at 100%.

A light beam can be characterized by its "chromaticity" and "luminance". The chromaticity can express the color content of the light beam as coordinates in a color space with primary colors on the axes. These coordinates can be adapted for the color sensitivity of the human eye and are referred to as the tristimulus values. The whitepoint of a color space comprises a group of colorspace coordinates that forms a region where the combination of the primary colors yield white light.

"Tristimulus". A human observer is unable to distinguish the brightness or chromaticity of light with a specific wavelength impinging on his retina. Instead, he possesses three distinct types of photoreceptors, sensitive to three distinct wavelength bands that define his chromatic response. This chromatic response can be expressed mathematically by color matching functions. Consequentially, three color matching functions, and have been defined by the CIE in 1931. They can be considered physically as three independent spectral sensitivity curves of three independent optical detectors positioned at our retinas. These color matching functions can be used to determine the CIE1931 XYZ tristimulus values. The CIE Tristimulus Values (XYZ) are calculated from the CIE Standard Observer functions, taking into account the type of illumination and reflectance of the sample. CIE Publication 15.2 (1986) contains information on the XYZ color scale and CIE Standard Observer functions.

The "tristimulus values" X, Y, Z gives a general representation of the contribution from each primary color of a color space. For example, chromaticity (x,y) and luminance/brightness Y[b] can be expressed as $x=X/(X+Y+Z)$ and $y=Y/(X+Y+Z)$, and the luminance/brightness $Y[lb]=Y$.

A color point can be described as (X,Y,Z).

The curve fitting can be performed as follows:

Establish polynomial (for instance of the second degree) expressions for the driving currents, for example I[red], I[green] and I[blue]. Fit the polynomials with the measured tristimulus values, Xr, Yg and Zb, i.e. Ired to Xr, Igreen to Yg and Iblue to Zb and update the LUT values with the fitted curves.

A "light modulator" or "spatial light modulator" can be an optical component that can modulate a light beam impinging on it. One type of light modulators can be referred to as "amplitude modulators" which can modulate the amplitude of the incoming light. This can be accomplished by technologies such as e.g. Liquid Crystal Display (LCD), Digital Light Processing (DLP) or Liquid Crystal on Silicon (LCoS), a micromirror digital device (DMD) or any other technology where a controlled amplitude change of a light beam can be introduced. Another type of light modulators can be referred to as "phase modulators" which can modulate the phase of the incoming light. This can be accomplished by technologies such as e.g. LCoS, Micro-Electro Mechanical Systems (MEMS), or any other technology where a controlled phase shift of a light beam can be introduced.

DETAILED DESCRIPTION

Embodiments of the present invention provide a calibration method and system for keeping an imaging projector at a predefined whitepoint within a certain tolerance, at a certain brightness or dimming level and at a varying ambient temperature.

1. The calibration preferably has a minor or no impact on the projector performance. While it is possible to perform the calibration by altering the light modulation devices, the lifetime of the projector can be compromised if an excess of light is generated at the light source level which can cause the light sources such as lasers or lasers plus wavelength conversion elements to decay faster. Also, part of the light is absorbed after the steering of the light modulator. Additionally, the contrast and color contrast/bit depth/dynamic range can be negatively affected.
2. The calibration is preferably designed with the least possible intervention for the user. For example, it can comprise an automated initial factory calibration, and then an integrated calibration can be foreseen in projector hardware and software for whitepoint control in the field, i.e. at a later date or later dates. The number of measurements performed by an operator should preferably be as low as possible.

Figure 16:
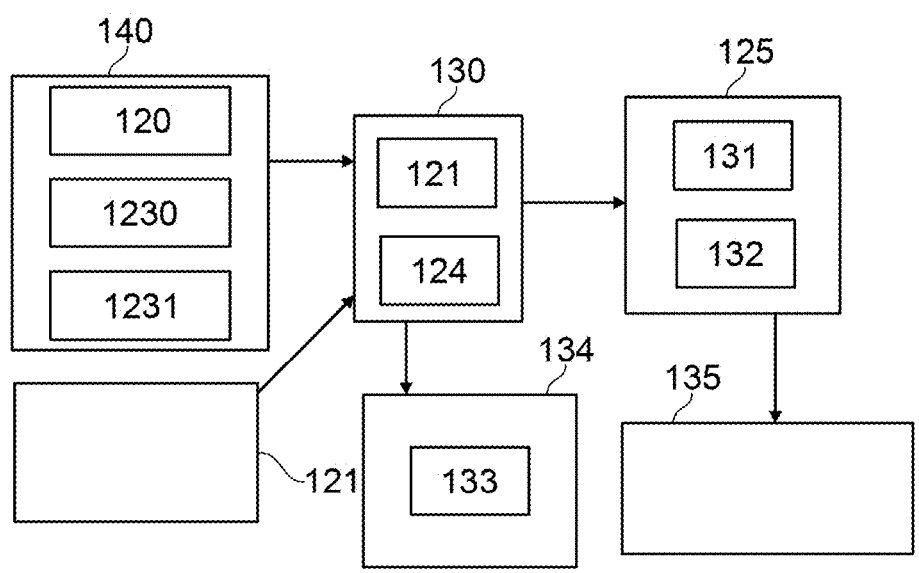
FIG. 16 shows a block diagram of an embodiment of the present invention comprising implementation on hardware.

Embodiments of the present invention can be described in three parts related to their location in the hardware, see FIG. 16. While the text below can describe how to linearize the projector light output with zero off-set, this is a simplification for the sake of discussion. It is also possible to choose an arbitrary desired function to describe the projector's light output versus dimming level e.g. linear or represented by a polynomial.

Part 1 and part 2 can be located in the laser driving module or light source controller. An aim of part 1 is to linearize the projector light output while maintaining the whitepoint, e.g. by linearizing a characteristic of the light generated by laser banks or groups of laser banks. This can be referred to as "dimming calibration". Alternatively, the generated light can be the resulting light after conversion by the wavelength conversion element. LUTs can be generated to linearize the behavior (a metric) of light generated by lasers or groups of lasers at a particular reference temperature.

LUTs can be generated which in use can linearize the behavior of lasers or groups of lasers at a particular reference temperature. The combined effect of all LUTs can provide a current to current conversion and alter the projector's brightness, e.g. linearly, when altering the driving currents for the laser banks. The projector's target chromaticity or color point should also be maintained. The driving currents can be collectively altered, e.g. by a setting of the means for setting a desired relative light output value or dimming level between 0, 5, 15 or 30% and 100%. This setting of these means can be an input slider setting.

An aim of part 2 is to ensure that the whitepoint remains stable also for temperatures other than the reference temperature. Accordingly, temperature correction factors can be established for each driving current. The ambient temperature is measured and the corresponding correction factor can be applied to the above LUTs.

Part 3 can be located in the Laser Control Board (LCB). When the above steps have been performed, the driving currents can be obtained that will give the desired chromaticity or color point values. The driving currents' values can be deduced from the LUT values with a percentage depending on the maximum dominant tristimulus value per laser source (or group of laser sources). These percentages can be referred to as alpha factors. In practice, the corrected driving current values can be obtained by multiplying the brightness values corresponding to the input slider setting, with the alpha factors. And then the corresponding current values can be extracted from the LUT. For example, the dimming or light output levels of the red, green and blue light sources or group of light sources can be tuned relative to each other so that the resulting white light exhibits the desired or target whitepoint value.

Embodiments of the present invention have one, some or all of the following advantages:

a) Only one tristimulus measurement is required, for example performed on white. The proper alpha factors can then be calculated and implemented using an integrated software program (part 3).

b) The target whitepoint can easily be obtained by applying the alpha factors (part 3) to the driving current LUTs.

c) The calibration for dimming or brightness levels (part 1) is a prerequisite for having predictive laser behaviour, whereby, this procedure can be automated.

d) The calibration can be performed at a range of temperatures (part 2), as long as it is kept within specifications of the laser sources. The target whitepoint can then be maintained over the range of temperatures.

e) The brightness level of the projector can be adjusted, e.g. using an input slider setting that can simultaneously alter the driving current for all light sources to thereby obtain a desired brightness or dimming level. There is no need to redo the calibration because the above linearization procedure assures that the set whitepoint remains stable also at other dimming levels (part 1). This allows operators to quickly install and calibrate the projector.

Figure 14:
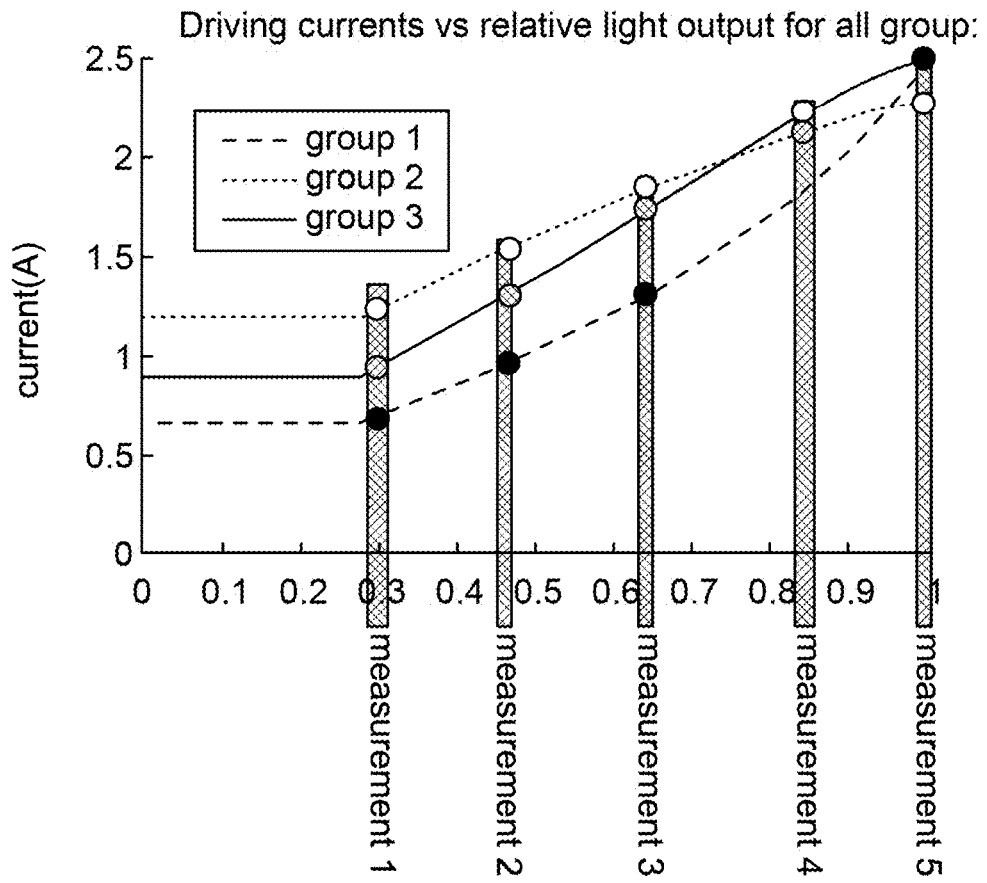
FIG. 14 shows a diagram from prior-art comprising conventional whitepoint correction.

The automated calibration procedure offers a significant improvement in terms of user friendliness. Conventional procedures require an extensive characterization of the projector. On several (for instance 5) projector brightness levels, several test patterns (typically white, blue and red) need to be measured, in order to characterize their brightness and chromaticity (or tristimulus values), which is time consuming, labor intensive and comes with a high risk of human error. See example in FIG. 14.

The details of each part will be presented below.

Part 1: Automated Integrated Whitepoint Calibration Over Brightness at a Reference Temperature The projector can comprise laser sources providing primary colours such as red, green and blue light, respectively. In the following, examples of laser sources are disclosed. For red color, red semiconductor laser banks based on GaInP or AlGaInP can be used. The maximum driving current is temperature dependent. These laser sources can be cooled by a cooling device such as one that is peltier cooled, but the target temperature can be set in relation to the ambient temperature (e.g. T ambient+1° C. or +4° C.), in order to avoid condensation. For green color, a bank or array semiconductor lasers having a typical dominant wavelength of 525 nm and an optical output power per laser diode of about 1 W can be used. These laser sources can be cooled using a traditional radiator with fans that cool cooling water flowing through a cooling circuit. For blue color, a bank or array semiconductor lasers having a typical dominant wavelength of 465 nm or 455 nm (depending on the application) and an optical output power per laser diode of about 4 W can be used. These laser sources can be cooled using a traditional radiator with fans that cools cooling water flowing through a cooling circuit.

A light source can comprise a "laser light source" which can comprise a multiple of laser light emitting devices of the same color or wavelength or wavelength band. Alternatively, the laser light source can comprise a wavelength conversion element, such as a phosphor. The wavelength conversion element is configured to emit light at a plurality of wavelengths after absorption of a light beam from at least one of the lasers at an excitation wavelength. The light generated by (groups of) lasers (or laser banks), can refer to eventual light emitted by the projector, so after conversion by the wavelength conversion element.

A configuration of a light source comprising a wavelength conversion element, can consist of a number of blue lasers, part of which generating direct blue light, which does not reach the wavelength conversion element, and part of which reaches the wavelength conversion element, where it is converted into yellow light. Alternatively, there can be 2 types of wavelength conversion elements, one which converts blue impinging laser light into green light and one which converts blue impinging laser light into red light; or a wavelength conversion element (which can generate green or yellow light from impinging blue light) with 2 types of lasers with distinct emission bands, for instance red and blue lasers.

Embodiments of the present invention can include wavelength conversion materials such as phosphors. In some embodiments the light sources can comprise only two generated colors such as primary colors, for instance when using a combination of direct laser light such as direct blue laser light and wavelength converted light such as phosphor converted light. A wavelength conversion element such as a phosphor can produce yellow light, e.g. when excited by a blue laser light. In this case, reaching the desired whitepoint may be difficult, but the blue and yellow light can be properly balanced to approximate the desired whitepoint.

LUTs can be used for laser light source controllers to determine proper laser driving current for different brightness levels. The LUTs can be simple tables which relate incoming laser driving current to outgoing laser driving current, which is then applied to a laser light source, for example a laser bank. Each individual laser bank can have its own LUT and can be modulated individually. A goal is to adapt the behavior of the different laser banks, or groups of laser banks of the same color, by choosing the content of the LUTs, such that the output of the projector behaves linearly with the input value. By the output value XYZ the tristimulus values are meant, which can represent the brightness and chromaticity of the projector.

In practice, the input of the LUT can be linked to means for setting a desired relative light output value or dimming level between 0, 5, 15 or 30% and 100%. These means can be a slider, which is intended to set the desired relative light output value or dimming level between 0, 5, 15 or 30% and 100%. The output value of the LUT can be given as an input current value (or an input current value derived from the LUT value) to the laser light source. For example, this can be implemented so that 100% corresponds to a fixed maximum laser current which depends on the specific laser light source type.

In theory, when determining a suitable laser driving current vs dimming level, the combined XYZ response of all the lasers should be considered. If the wavelength of the lasers can drift (e.g. due to temperature changes) the relative XYZ response of the lasers can drift. In order to simplify the calibration, and to enable part 3, the inventors have found that particular laser banks mainly contribute to one of the tristimulus values. For example, the red, green and blue laser light sources contribute mainly to the X, Y and Z values, respectively when using direct lasers and no wavelength conversion element is used. When using a wavelength conversion element, the dominant tristimulus value generated by the source may be used.

Hence, a significant simplification can be made by only linearizing the respective responses by using the output of the corresponding laser sources, or group of laser sources.

This allows to determine the driving currents of the primary colour light sources such as R, G and B laser light sources resulting in proper whitepoint values, individually, without considering the cross-influence of the different lasers. Without this simplification, all the dimming curves need to be redetermined when altering the final alpha factors. In general, this will result in an acceptable error over dimming, and remaining corrections are small and can be performed with the light modulator without influencing final image quality.

It is possible however that special arrangements need to be implemented for very high dimming levels (low brightness levels).

The temperature correction will be active both during factory calibration and field calibration. The differences due to temperature changes are compensated for, and the combined light output behaves as if it is used at the reference temperature (e.g. 25° C.) when making the relation between the current at the reference T in the light source controller and the corresponding laser light output. Fitting can be performed between the measured tristimulus values and the current expressions at the reference temperature (e.g. 25 degrees Celsius) and the calibration LUTs of the light source controller can be updated with the fitted values.

Initial Characterization of the Laser Sources

FIG. 1 shows a flow chart of an embodiment of the present invention comprising characterizing the light sources. In step 10 the means for setting a desired relative light output value or dimming level is set such as a slider setting is set to a level between 1 and 100% and in step 11 combined with the LUT which here is a 1-to-1 LUT. The temperature is kept at T[refa] in step 12 by means for temperature control. The means for temperature control can include cooling and/or optionally heating.

In step 13, the light source controller drives the light sources with the input currents related to the setting of the means for setting a desired relative light output value or dimming level, such as slider setting step 10, and the light sources are allowed to stabilize. In step 14, the light source controller instructs the light sources to output the primary colours such as red, green and blue light. In step 14 an image can then be generated by using the spatial light modulator and displayed, and an external image sensor can detect the at least one tristimulus value of the light displayed. In step 15, the procedure of steps 10-14 can be repeated at different settings of the means for setting a desired relative light output value or dimming level such as slider settings for the same T[refa]. In step 16, expressions for the RGB current values are defined and fitted to the measured tristimulus value or values.

The curve fitting can be performed as follows:

Establish polynomial (for instance of the second degree) expressions for the driving currents, for example I[red], I[green] and I[blue]. Fit the polynomials with the measured tristimulus values, Xr, Yg and Zb, i.e. Ired to Xr, Igreen to Yg and Iblue to Zb and update the LUT values with the fitted curves.

In step 17 the whole procedure can be repeated for different settings of the means for setting a desired relative light output value or dimming level such as the slider settings, for different temperatures. In step 18 the LUT is updated with the fitted driving currents.

Figure 2:
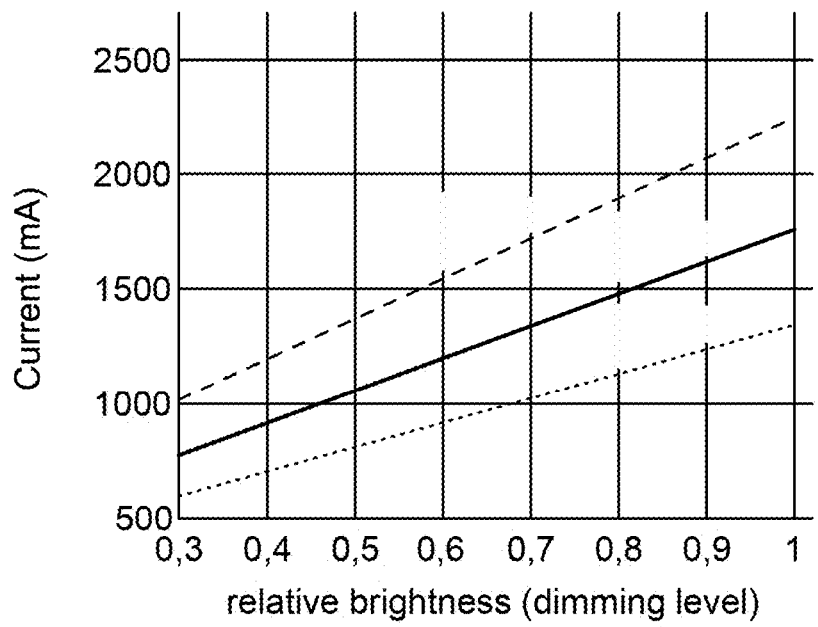
FIGS. 2 to 4 show graphs of embodiments of the present invention comprising current values as a function of relative brightness.
Figure 3:
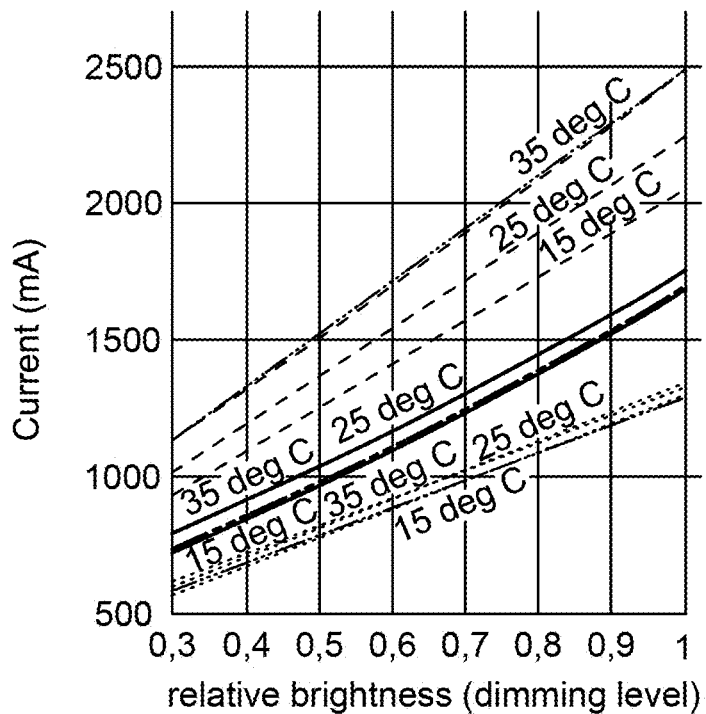
Figure 4:
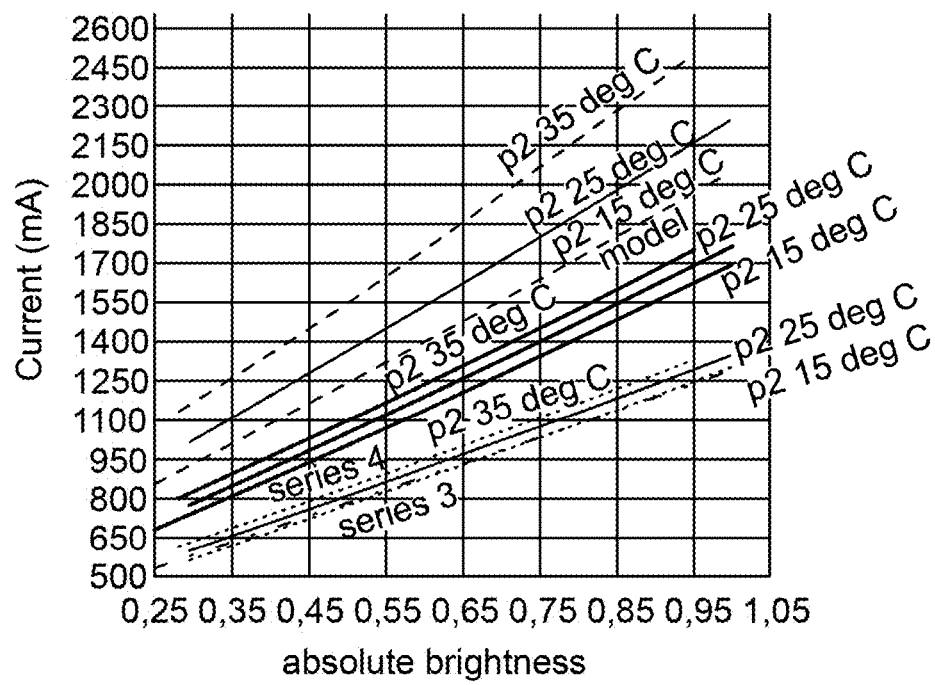

The result of fitted driving current expressions for one temperature (e.g. 25 deg C.) as a function of the dimming level can be seen in FIG. 2 for red ( - - - ), green ( • • • ) blue (—). FIG. 3 shows the fitted driving current expressions for three temperatures (15, 25 and 35 deg C.) for red ( - - - ), green ( • • • ) blue (—) and the model (- ¨ -) as a function of the dimming level. The model has been fitted to the 35 deg C. curve. In FIG. 4, the model has been fitted to the 15 deg C. curve. The model of a temperature T[1] has been obtained by multiplying the reference current curve with the scaling factor for temperature T[1].

In FIGS. 3 and 4, the obtained calibration curves at different ambient temperatures are depicted. There is a subtle difference, however which resides in the meaning of the x-axis. In FIG. 3, all curves are normalized to the maximum brightness level at that particular temperature. The brightness corresponds to the x-axis value, so for all cases, the relative brightness level 1 on the x-axis always corresponds to the maximum of the curves made for each temperature.

Yet, in reality the maximum brightness which can be reached by the lasers differs depending on the ambient temperature which influences the operating temperature. The reason is that lasers may emit a different amount of light at their maximum driving current depending on their operating temperature.

This is what is illustrated in FIG. 4: depending on the ambient temperature, the curves are not normalized to the maximum brightness level at that particular temperature. Hence, it can be seen in this figure that the maximum brightness slightly alters depending on the ambient temperature, as the maximum value of the curves reached on the x-axis differs.

In practice, a preferred solution is the one displayed in FIG. 3, as in this figure, the x-axis can be used as a setting for the means for setting a desired relative light output value or dimming level such as a slider setting, with the downside that the brightness of the projector can alter slightly depending on the ambient temperature. But this can, for instance, be controlled using the internal light sensor. If the x-axis of FIG. 4 would be used as a setting of the means for setting a desired relative light output value or dimming level such as a slider setting, additional measures need to be taken to get the most out of the projector, as the maximum setting of the means for setting a desired relative light output value or dimming level such as the maximum slider setting will depend on the ambient temperature.

Figure 5:
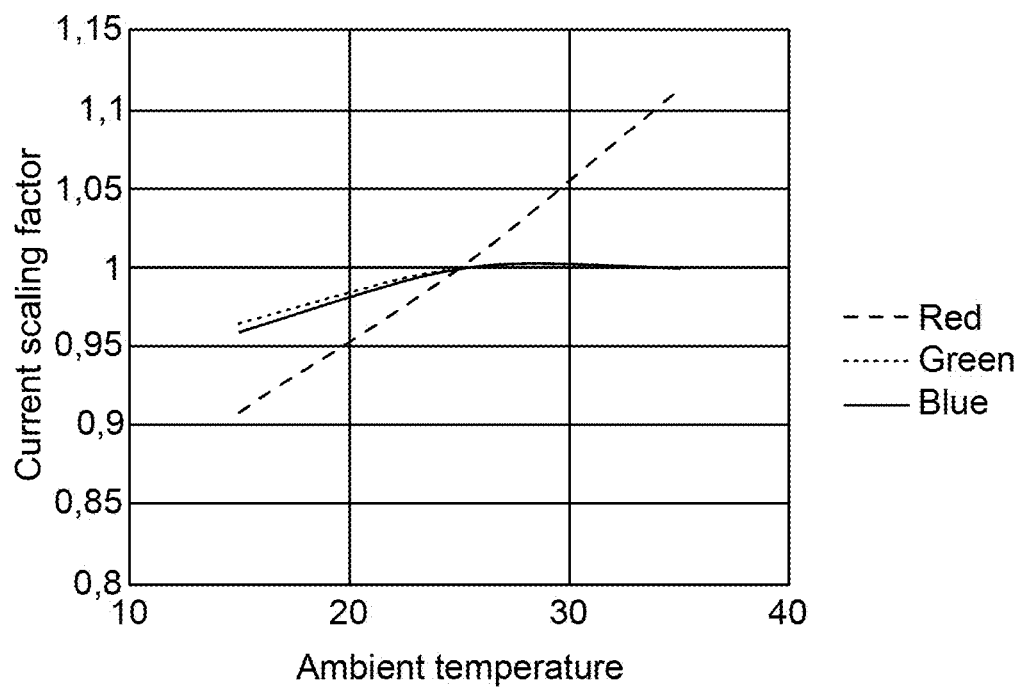
FIG. 5 shows a graph of an embodiment of the present invention comprising a current scaling factor as a function of temperature.

Inspection of FIGS. 2 to 4 shows that a fitted curve for the same color differs from its neighbouring curve with a constant scaling value or differs approximately. This scaling factor has been identified and is illustrated in FIG. 5 for red ( - - - ), green ( • • • ) and blue (—) as a function of the ambient temperature. This means that if the input driving current to output behaviour of a light source at a reference temperature T[ref] is known and described by a LUT, and that a scaling factor for temperature T[1] is established, the behaviour at temperature T[1] can be obtained by multiplying the LUT values with the scaling factor for temperature T[1]. Optionally, a compensation for drift over time can be implemented. Additionally, the correction can be made more complex, e.g. being a linear correction, including a scaling factor and an off-set value. The driving currents for all light sources of the same color can optionally use the same scaling factor function. The scaling factor values can then be applied to the values of the LUT.

This temperature correction can be performed beforehand for a number of temperatures T[refa], T[refb], T[refc], . . . , and the values can then be used in the factory calibration and the field calibration described below. The temperature correction values can be obtained experimentally in a climate chamber or by using input values from data sheets. Exemplary embodiments are given below.

The temperature correction can be used during the dimming calibration (part 1) to make sure that the laser light source behaves as if it is used at the reference temperature. This is necessary when performing the calibration algorithm to determine new dimming curves, since these are designed for the reference temperature.

The temperature correction is also used during the normal operation of the projector to correct the driving currents of the lasers continuously when the ambient temperature changes.

The temperature scaling factors can be checked and updated over time. For RGB laser sources, the scaling corrections for the green and blue laser sources are minor compared to the correction for the red laser source. Hence, the main focus is on the correction performed on the red laser sources. If the relation starts to alter significantly over time, it is possible to redo the calibration at different light source operation temperatures by altering the settings of the internal cooling system (e.g. peltier elements or cooling fans).

Factory Calibration

Figure 6:
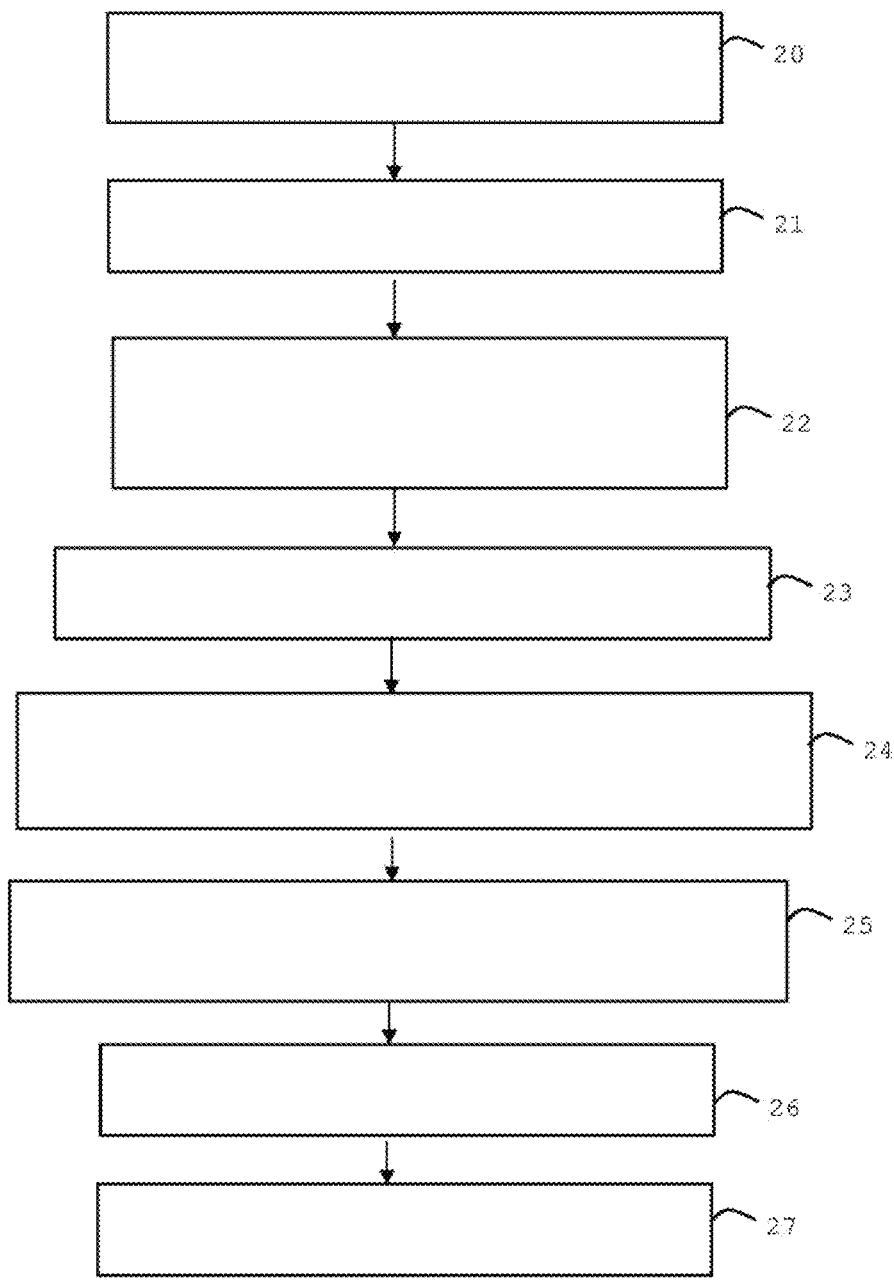
FIG. 6 shows a flow chart of an embodiment of the present invention comprising a factory calibration.

The resulting LUT values obtained from FIG. 1 step 18 can be used as initial values when performing a factory calibration, as shown in FIG. 6. The procedure is similar to that of the initial characterization in FIG. 1, but comprises a calibration to the actual measured ambient temperature.

In step 20, the slider setting is set to a first value, e.g. 100%, and a reference temperature T[ref1] of the initial characterization is chosen. In step 21 the LUT[ref1] is uploaded (which is valid for T[ref1]) to the light source controller. In step 22 the ambient temperature T[amb1] is measured and the driving current LUT[ref1] is corrected with the scaling factor of T[amb1]. In step 23 the driving currents can be provided to the light sources and let them stabilize. In step 24 the light source controller then instructs the projector to output the primary colours such as red, green and blue light. In step 24 an image can then be generated by the light modulator, and an external image sensor can detect at least one tristimulus value and brightness of the image. In step 25 steps 20-24 can then be repeated for other slider settings using the reference temperature T[ref1]. Expressions for the RGB current values are defined and fitted to the measured tristimulus value or values in step 26. The above method for curve fitting can be used. In step 27, the LUT[ref1] can be updated with the fitted driving current values, whereby the updated LUT can be referred to as LUT[amb1].

Optionally, additionally enhancements can be made to make sure that the calibration is obtained with the best possible compromise between accuracy and throughput time.

A. Use of standard driving currents curves as the initial LUT.

Determine standard curves by averaging the curves from several projectors. The standard curves can be uploaded automatically during production, and included in the software package.

A simple check is made to determine whether the standard curve results in sufficient performance.

Determine new finetuned curves if the performance is not sufficient.

The standard curves can remain in the drivers if it is sufficient.

New updated LUT values can be calculated by using the above mentioned method for curve fitting.

B. Optimize measurements over dimming range.

Depending on the light sources native whitepoint, the required alpha factors can differ significantly. This means that the range of operation of the lasers can also differ significantly. The curves can be made, by also taking the alpha factors into consideration, by carefully choosing the measurement points depending on the alpha factors. This makes sure that no extrapolations have to be made, which could result in errors.

In Field Calibration

When performing a calibration or a re-calibration of a projector in the field, the internal color sensor of the projector can be used to determine values for the LUTs for the different lasers. A color sensor can be selected that can measure the tristimulus values XYZ. The sensor can comprise filters that approximate XYZ tristimulus responses. The procedure can be run automatically without need for operator interaction. The required time to run the algorithm can also be optimized. For example, it can take 10-15 min to execute. As it is an automated procedure, it can for instance be performed at night, or at a moment when there is no need to project content, and no operator needs to be present on the spot to interact.

Figure 7:
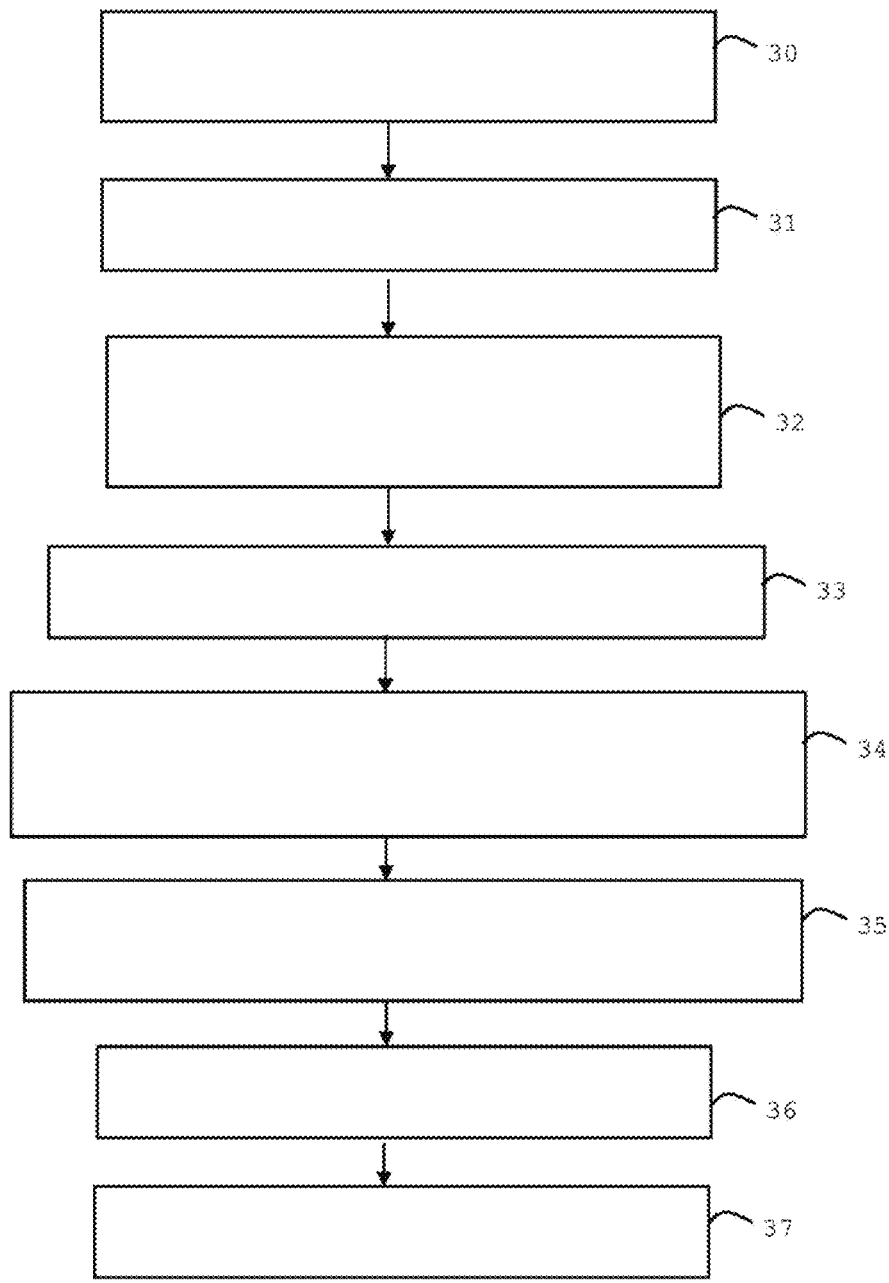
FIGS. 7 and 8 show flow charts of embodiments of the present invention comprising a field calibration.

FIG. 7 shows a flow chart of the procedure. In step 30 the slider setting is set, e.g. to 100% and a reference temperature T[ref2] is chosen. T[ref2] may be the same as T[ref]. In step 31 the driving current LUT for T[ref2] can be uploaded to the light source controller. Similar to the factory calibration, standard values (that are valid for T[ref2]) can be used as a starting point. In step 32 the ambient temperature T[amb1] is measured and the LUT[ref2] is corrected for T[ref2] with the scaling factor of T[amb1]. In step 33, driving currents are supplied to the light sources and they are allowed to stabilize. In step 34, the light source controller can now instruct to sequentially enable (groups of) lasers such as red, green and blue lasers, and the internal color sensor can detect at least one tristimulus value of the light. Preferably, the internal color sensor is located before (i.e. upstream of) the light modulator so that it detects the light from the light sources (and not from the light modulator). During measurement, each light source can be switched on while the other light sources are turned off. Between each measurement, all the light sources can be turned on, e.g. in order to stabilize them and bring them to a similar state. The internal sensor may only measure an approximate chromaticity. Step 35: Repeat steps 30-34 for different settings of the means for setting a desired relative light output value or dimming level such as slider settings using reference temperature T[ref2].

In step 36 expressions for the RGB current values can be defined and fitted to the measured tristimulus value or values. The above method for curve fitting can be used. In step 37, the LUT is updated with the fitted driving current values obtained in step 36.

A check of the stabilization in step 33 can be performed based on internal sensor measurements.

For example, relative differences in X, Y and Z in small time intervals can be investigated. If changes are below a predefined threshold two consecutive times, the measurement is considered to be stable. The maximum number of stabilization checks can be kept limited to avoid too long throughput times of the algorithm.

In case the light sources are laser banks, each laser bank can be calibrated individually or all laser banks of the same color, can be simultaneously characterized. The response of each laser bank can differ, so calibrating them individually can help to obtain a better result.

Figure 8:
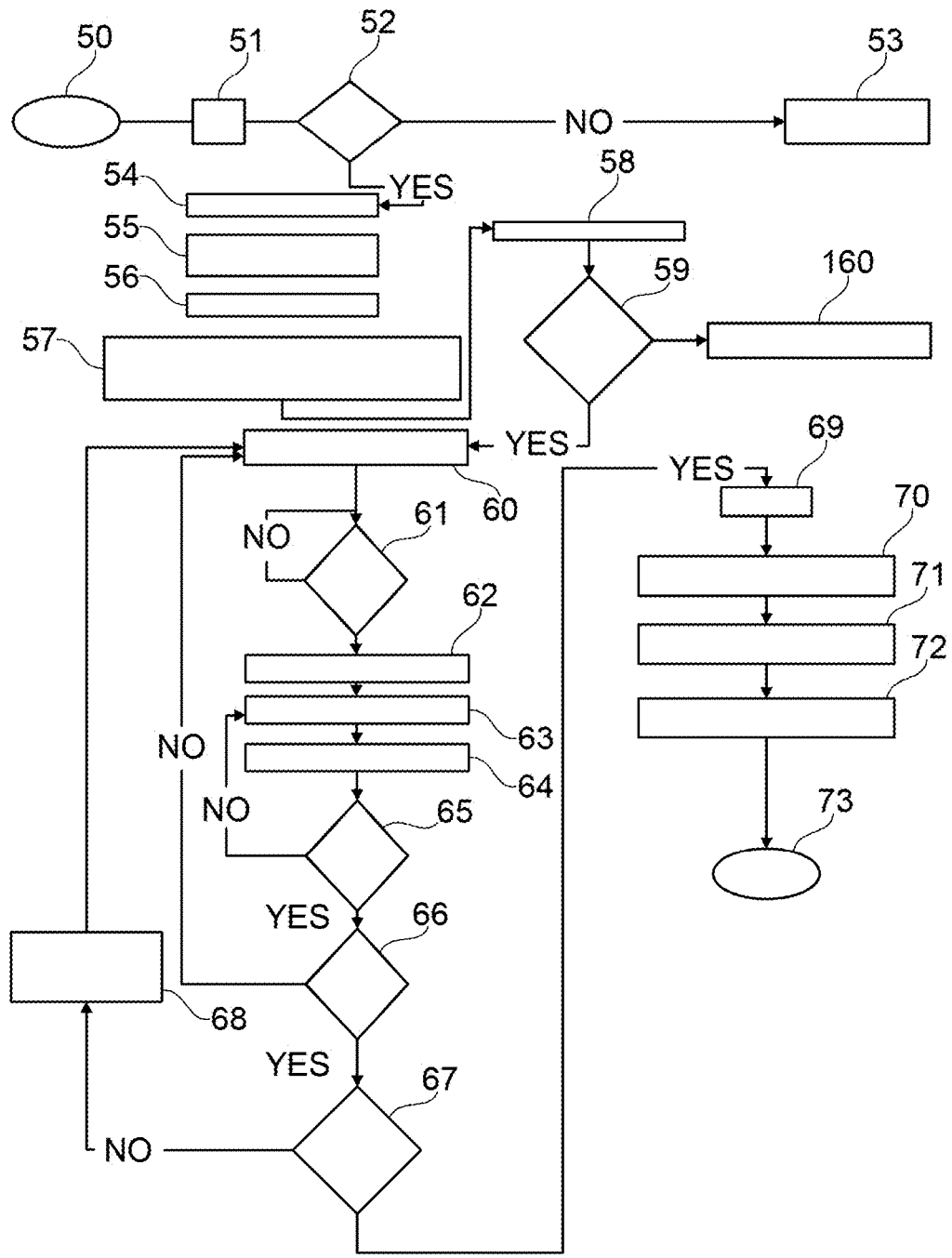

An exemplary embodiment of a field calibration procedure for laser light sources is provided in FIG. 8. The laser light sources are arranged in laser banks per color.

The procedure starts in step 50 with connecting to the projector in step 51 and deciding in step 52 whether the ambient temperature lies within operating range. If this is not the case, then in step 53 the program is exited and a notification is provided that the calibration cannot be executed. In step 54, it is determined whether the temperature is within operating range, whether the projector is on. In step 55 all laser light sources can be turned on and in step 56, a black image can be projected.

In step 57 a first calibration setting can be applied by uploading precalculated curves and the value set by the means for setting a desired relative light output value or dimming level such as the slider setting can be set to its maximal value. Alternatively, one can avoid uploading tables, and instead use the alpha factors in combination with linear LUTs. These don't have to be uploaded, and they can be set without delay, e.g. to directly set desired current values. In order to know the suitable values to apply, one can calculate reference driving curves. For the first measurement, the output is preferably at its maximum, so one can maximize alpha factors and slider settings. The calculated driving currents at other levels can be later on applied by either setting a lower slider setting, in case the curves are uploaded, or alternatively by setting the proper alpha factors such that the desired currents are applied. Then set integration time to 64 ms in step 58. Decide whether the measure procedure should be performed per laser bank in step 59. If this is not the case, apply the method of steps 60 to 73 mutatis mutandis to all laser banks per color in step 160.

In step 60, all laser sources can be enabled for thermal stabilization. In step 61 whether the stability criterion is reached can be checked, or if the maximum number of iterations have been reached. If none have been fulfilled, the algorithm goes back to step 60. If at least one has been fulfilled, the laser bank is enabled to be measured in step 62. A laser bank can be enabled by supplying it with the proper driving current.

The method for the preparation of light sources having at least one laser and a wavelength conversion element or banks of lasers with at least one bank having a laser and a wavelength conversion element e.g. as used in laser phosphor based projectors, is largely the same as for direct laser light projectors with the following modifications.

These modified steps relate to the way that the laser banks are enabled/switched to be measured:

- As described above, laser banks can be gauged by enabling the laser bank under test, and disabling all others:
- If at least one has been fulfilled, the laser bank is enabled to be measured in step 62.
- The above description comprises the step of measuring a laser bank by enabling it, and disabling all the other laser banks, such that only the specific laser bank is being measured.
- In the case of laser phosphor projectors, blue lasers can be used to generate direct blue light, and other blue lasers can be used to generate yellow phosphor light. Additionally, red lasers can be used to improve the saturation of the red primary. For the calibration method, the distinction is made between the laser banks which are used to excite the phosphor, and the laser banks which are generating direct laser light. In the case of lasers generating direct laser light, the previously described method can be maintained. For the banks generating light from a wavelength conversion element such as a phosphor, the method is altered:
- For each driving setting, a reference measurement is taken, by enabling all lasers in the laser banks.

Each laser bank which generates phosphor light is measured sequentially, by performing a measurement while this laser bank is disabled and all the other laser banks are still enabled.

The contribution for each bank is than obtained by calculating the differences between the reference measurement, and the measurements per disabled bank.

The obtained contributions per laser bank are then scaled, such that the sum of the contributions of all laser banks is equal to the reference measurement.

This change in procedure is introduced because the phosphor based laser light sources behaves non-linearly. At higher impinging blue light levels, a relatively lower amount of light is phosphor-converted, compared lower impinging blue light levels. By disabling single banks, the contribution of that particular bank is properly assessed at the corresponding phosphor operating regime.

Laser banks with a laser and a wavelength conversion element are then ready to be measured as in step 62 mentioned above.

In step 63 the tristimulus values can be measured e.g. with the internal image sensor repeatedly (for instance 3 times), and the results can be averaged. In step 64 a stability criterion can be calculated and in step 65 whether the stability criterion is reached can be checked for two consecutive times, or whether the maximum number of iterations have been reached. If this is not the case, the algorithm returns to step 63. If yes, it is checked if the present laser bank is the last laser bank to be measured at the present setting of the means for setting a desired relative light output value or dimming level such as the present slider setting. If this is not the case, go to step 60. If it is the case (yes), it is checked in step 67 if the final setting of the means for setting a desired relative light output value or dimming level such as the final slider setting is reached. If this is not the case, the next driver setting is set in step 68. This can be obtained by altering the setting of the means for setting a desired relative light output value or dimming level such as altering the slider setting or by setting proper alpha factors, as described above. The algorithm the returns to step 60. If in step 67 the final driver settings have been reached, data processing is activated in step 69. In step 70, the currents can be either retrieved from the LUTs, but in case the alpha factors are used, the currents were predetermined, as described above. In step 71, the measured values can be fit to the corresponding applied current values. For the blue banks, the measured Z signal will be linked to the applied blue current, for the green banks the measured Y signal will be linked to the green current, and for the red banks, the X signal will be linked to the red driving current. To obtain all the values of the LUTs, fits of these signals can be made, for instance using second degree polynomials, and retrieving the suitable driving currents for the LUTs, which allow linearizing the red lasers depending on X, the green lasers depending on Y, and the blue lasers depending on Z. In step 72, the LUTs are uploaded to the laser source controller. End the procedure in step 73.

Temperature Correction by Measurements

A projector can be placed inside a climate chamber and a spectrometer can measure the emitted light spectra through a window of the climate chamber. The spectrometer can be located outside the climate chamber in order to keep the spectrometer from being influenced by temperature changes during the measurements. The window influence can be compensated for.

The measurements can be performed at typical operating temperatures, for example between 15° C. and 35° C. A nominal reference operating temperature (ROPT) of 25° C. can be chosen as an initial value for the correction algorithm. The reference operating temperature (ROPT) can be selected from any suitable operating range such as between 5 and 50° C., or 10 to 40° C. or 15° C. to 35° C. as examples. At this reference ambient temperature, LUTs of laser driving currents that yield different brightness or dimming levels can be determined. Also, the individual laser driving currents should be selected so that when the light beams are combined, the combined light beam can yield a desired outcome, for example a whitepoint value within a predefined limited spread. All laser sources emitting the same color can be driven at the same driving current for a certain dimming level, so that the laser sources of the same color are all driven at a first driving current for a first dimming level, and at a second driving current at a second dimming level, and so on.

The following steps can be implemented to fit the measured driving currents to linear models:
1. Upload initial linear LUTs to the laser light source controller.
2. For several dimming levels, measure the tristimulus values on a white, red, green and blue image.
3. Define linear and quadratic (or higher order polynomial) models that relate the red, green and blue laser driving currents describing the measured XYZ tristimulus values.

Linear Model:

$$\begin{cases} X_r = a_{X_r} I_r + b_{X_r} \\ Y_r = a_{Y_r} I_r + b_{Y_r} \\ Z_r = a_{Z_r} I_r + b_{Z_r} \end{cases}$$

$$\begin{cases} X_g = a_{X_g} I_g + b_{X_g} \\ Y_g = a_{Y_g} I_g + b_{Y_g} \\ Z_g = a_{Z_g} I_g + b_{Z_g} \end{cases}$$

$$\begin{cases} X_b = a_{X_b} I_b + b_{X_b} \\ Y_b = a_{Y_b} I_b + b_{Y_b} \\ Z_b = a_{Z_b} I_b + b_{Z_b} \end{cases}$$

Quadratic Model:

$$\begin{cases} X_r = a_{X_r} I_r^2 + b_{X_r} I_r + c_{X_r} \\ Y_r = a_{Y_r} I_r^2 + b_{Y_r} I_r + c_{Y_r} \\ Z_r = a_{Z_r} I_r^2 + b_{Z_r} I_r + c_{Z_r} \end{cases}$$

$$\begin{cases} X_g = a_{X_g} I_g^2 + b_{X_g} I_g + c_{X_g} \\ Y_g = a_{Y_g} I_g^2 + b_{Y_g} I_g + c_{Y_g} \\ Z_g = a_{Z_g} I_g^2 + b_{Z_g} I_g + c_{Z_g} \end{cases}$$

$$\begin{cases} X_b = a_{X_b} I_b^2 + b_{X_b} I_b + c_{X_b} \\ Y_b = a_{Y_b} I_b^2 + b_{Y_b} I_b + c_{Y_b} \\ Z_b = a_{Z_b} I_b^2 + b_{Z_b} I_b + c_{Z_b} \end{cases}$$

4. For each dimming level, fit the laser driving current for each laser to the measured XYZ tristimulus values. This can be based on the linear equations using matrix formalism.

5. The calculated driving currents can be used in the quadratic equations to determine a correction factor which relates to the error obtained when replacing the quadratic equations with linear equations.
6. The laser driving currents can be improved by performing one or more further iterations using the correction factors obtained in the previous iteration.
7. Stop the optimization when the improvement is less than a predetermined value, for example 10e-8.

Steps 1-7 can be repeated using other ambient temperatures. Consider that at other ambient temperatures, other driving currents will most likely be needed in order to reach the same desired whitepoint (value range). FIG. 3 shows driving currents for the red, green and blue laser sources as a function of dimming level, at a number such as three different temperatures within the range of ROPT such as 15, 25 and 35° C. respectively. Other temperatures can be selected e.g. selected rom the range 5 to 50° C. or 10 to 40° C.

The x-axis has a relative meaning in this plot the maximum value 1 of the x-axis always corresponds to the maximum light output value of the projector at that particular operating temperature. The light output is limited by the red current, for all 3 temperatures. The same optical power is reached for the 3 cases (as the max current for red is determined by the optical power), but due to changes in laser operating temperature, the operating wavelength shifts, which causes the light output to alter. Hence, the maximum light output is lower at higher operating temperatures due to this effect. This effect is illustrated in FIG. 4, where the maximum light output at 25° C. is taken as the reference (ROPT). It can be seen on the plot that the maximum brightness value on the x axis is slightly lower at 35° C. operating temperature, and slightly higher at 15° C. due to this effect.

Based on the above measurements, a correction scaling factor for each laser source driving current can be established for each operating temperature other than 25° C. A scaling factor for a temperature T[1] can be tested by multiplying it with all the values of the reference curve and the result should be close to the driving current for the temperature T[1]. The error can be assessed using a metric, for instance the sum of the squared differences between the scaled and the actual curve.

As the reference curves in combination with the scaling factors approximated the actual curves closely at every dimming level, the scaling factor can be made independent of slider setting but dependent on the ambient temperature. This has the advantage that when driving the laser sources, it is sufficient to know the ambient temperature, and the laser source driving currents can then be multiplied with the correction factor of that temperature.

FIG. 5 shows an example of current scaling factors as a function of the ambient temperature for laser sources emitting red, green and blue light, respectively.

Temperature Correction by Using Data Sheets

Alternatively, the temperature correction values can be obtained by using datasheets with the electro-optical values of the laser sources.

Optical power=P0=f(I,Tm)
Lambda=f(I,Tm)
Voltage=f(I,Tm)

Where the function f(I,Tm) depends on the current I and the laser module temperature Tm, lambda is the wavelength of the laser in use.

Optionally, additional inputs related to e.g. the optical and thermal design of the projector can be used to define the function to obtain the desired calibration curves. For example, the number of laser banks per color or the projector transmission (i.e. how efficient a projector is in converting generated laser light to actual light emitted by the projector), or the temperature setpoint of peltier coolers, or a thermal model of the thermal resistance (Rth) between laser and the ambient environment.

Based on this information, combined with the known CIE XYZ curves, the XYZ response can be modelled per laser type as functions of I and Tm. From this model, the proper currents can be found to reach the intended whitepoint target by the following procedure:

1) Enter values for the current and for the ambient temperature
2) For red, the temperature can be set to ambient temperature+an off-set, for example +4° C.
3) For green and blue, the initial Tm values can be estimated
4) Based on these, Tm can be calculated more accurately by:
   a) Calculate P0, V
   b) Calculate generated thermal power from laser=Pth=UI-P0
   c) Calculate Tm=Tambient+Pth*Rth The laser driving currents at the reference temperature can now be determined as follows:

Start from the reference ambient temperature or ROPT, e.g. 25° C.

Calculate XYZ responses for all laser sources or laser banks.

Calculate the combined whitepoint value of the light emitted by the projector. Determine the driving currents for all lasers, such that a desired tristimulus values and maximum light output is reached.

To reach max light output, at least one of the driving currents needs to be at its maximum.

The above method can be used to determine suitable driving currents at ambient temperatures different from the reference temperature (ROPT). The operating temperature dependent maximum driving current of the red lasers should be taken into consideration when determining the max driving currents. One should also consider here that one of the laser types should reach its maximum current.

Similar to the experimental method, relationships can be established between the driving currents at different temperatures. Suitable driving currents can be calculated in the operating range such as 5° C. to 50° C., 10° C. to 40° C., or 15° C. to 35° C. in steps of number of ° C. such as 5° C.

The above method can be repeated for reduced brightness levels. The goal is then to determine the currents which lead to reduced brightness levels, with respect to the maximum light output emitted at the ambient temperature.

Measured Chromaticity Error After Calibration

A projector was put inside a climate chamber and the above calibrations and corrections were implemented. The whitepoint of the projector's emitted light was measured at several dimming levels and at several ambient temperatures with a high-end spectrometer.

Figure 9:
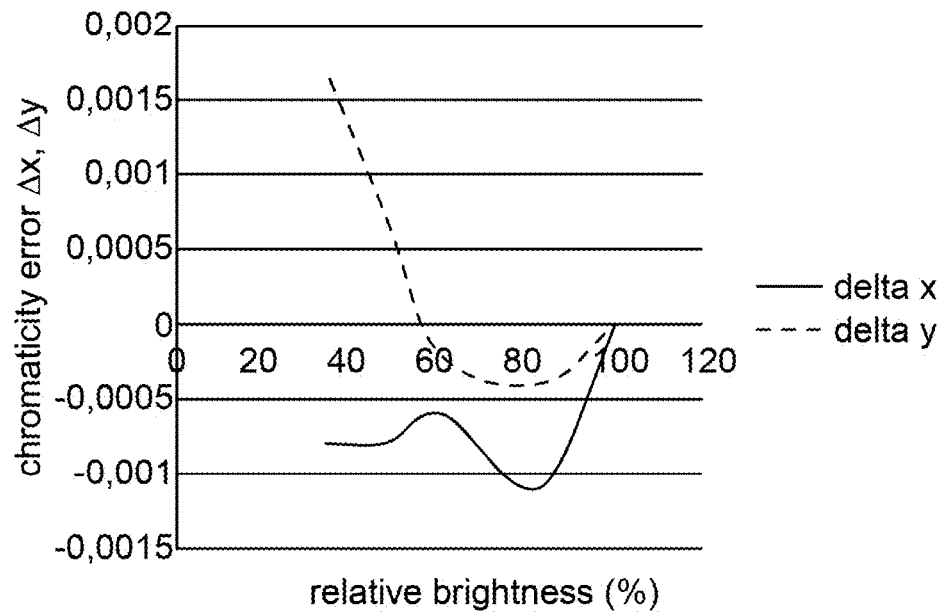
FIGS. 9 to 11 show graphs of embodiments of the present invention comprising the measured chromaticity error.
Figure 10:
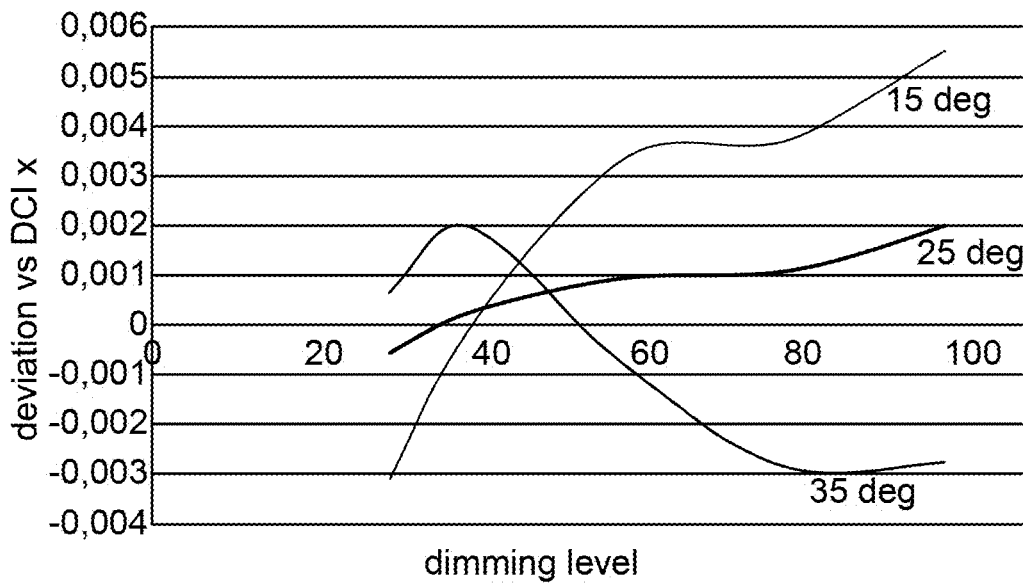
Figure 11:
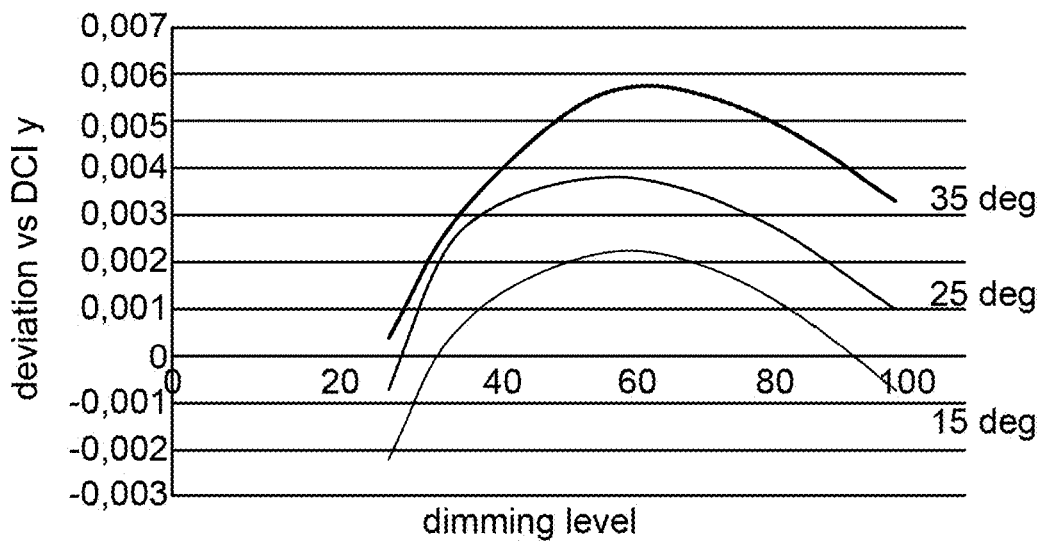

The measured chromaticity errors are shown in FIGS. 9 to 11, and only minor imperfections can be seen. These deviations may be due to the simplified method of fitting the currents to X, Y or Z separately without interdependency between color bands or to the fact that the color sensor used in the projector uses imperfect filters, and, hence, the measured responses are not perfect, for instance when the laser wavelength drifts.

For example, the DCI (Digital Cinema Initiatives) specification put the following constraints on chromaticity: $\Delta x \leq 0.006$ and $\Delta y \leq 0.006$. The results in FIG. 9 show that the resulting projector output whitepoint lies within the DCI specification.

Part 3: Use of the Above Calibrations for Whitepoint Correction

The primary lasers such as red, green and blue lasers (with or without a wavelength conversion element) can be individually dimmed to different amounts to reach a desired whitepoint, for instance the DCI whitepoint. For example, when using direct RGB lasers, without a wavelength conversion element, red, green and blue lasers can be individually dimmed to different amounts to reach a desired whitepoint, for instance the DCI whitepoint.

When using a wavelength conversion element, one can use a similar methodology to find the proper balance.

In some embodiments of the light source, there can be only 2 generated primary colors, for instance when using the combination of blue lasers and phosphor converted light. In this case, reaching the desired whitepoint is not always possible, but the blue and yellow light can be properly balanced to approximate the desired whitepoint.

Figure 12:
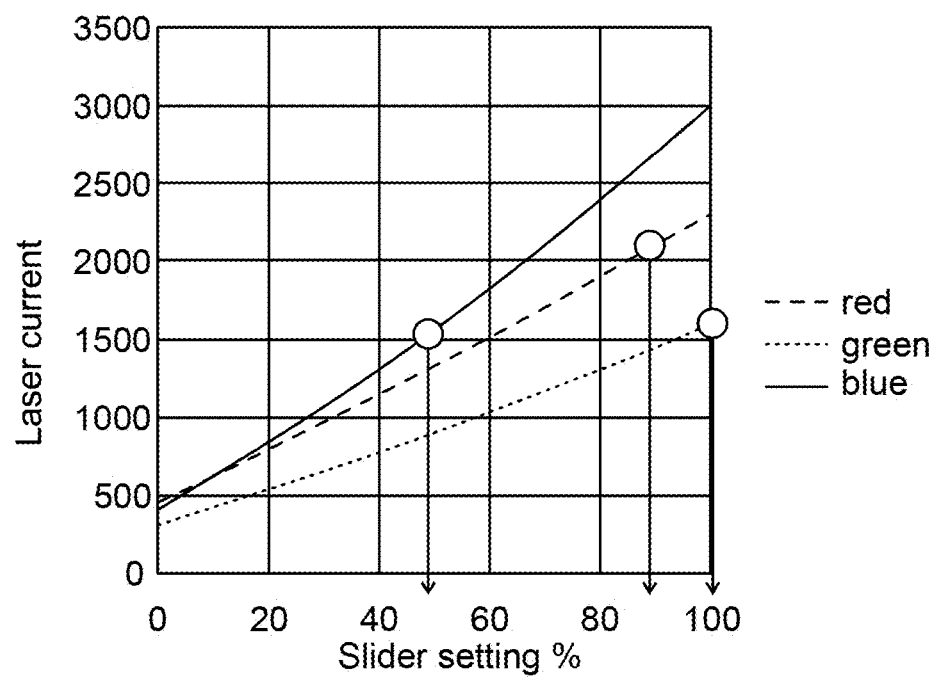
FIG. 12 shows a graph of an embodiment of the present invention comprising the alpha factors.

This individual dimming can be described by additional scaling factors alpha[red], alpha[green] and alpha[blue], illustrated in FIG. 12. The calculations of the alpha factors can be non-trivial and are described further below. Once the alpha factors are calculated, laser current to brightness curves, e.g. as in FIG. 2, can be used to obtain the current values for each individual light source. Since the alpha factors give the individual dimming level, the corresponding current can be found from the graph (or related tabulated values). An example is shown in FIG. 12, where white circles indicates the alpha factors' position on the current curves.

This means that the overall brightness output can be controlled by the combination of the slider setting, which affects all lasers driving currents, and the alpha factors. A linear response of the laser sources is here prerequisite for the method to function properly e.g., when the LUTs are designed for a linear light output vs. dimming level.

The calculated alpha factors can then be set, and the desired whitepoint will approximately be reached. Fine tuning can still be done afterwards to reach the whitepoint even more accurately.

For an RGB projector with direct laser light in the three primary colours RGB, the red, green and blue primaries can be individually controlled to reach a destination whitepoint by controlling the individual laser light sources as described above.

For a phosphor based projector, the red primary can be composed of red phosphor light obtained from a wavelength conversion element, as well as direct red laser light from a red laser, to reach a saturation of red. So, when changing brightness the wavelength conversion elements such as a phosphor and laser red light should be driven proportionally, in order to maintain the red saturation. The blue/yellow balance can improved, by taking into consideration that the desired whitepoint should not be reached. Instead, by doing a combination of alpha factor correction and electronic correction at the spatial light modulator (DMD) level, the target whitepoint can be reached with minimal compromises. This combination is done by calculating the required correction on the red green and blue primaries, and by applying the minimum correction of red and green to the lasers generating yellow and red light. The required correction for blue can be applied directly. The remaining correction can be done by the electronic spatial light modulator (DMD) correction.

If there is bleed through on the phosphor based light sources, e.g. some blue light bleeds through the phosphors, the driving of the blue lasers will need to adapted suitably, to cope with this effect. Quantum dots may be used as the wavelength conversion element and quantum dots can allow bleeding of the excitation light such as blue laser light through the quantum dots without conversion. The total blue light generated as the blue primary will partially comprise or consist of blue light generated directly by blue lasers, and partially of light which is directed towards the phosphor, but which bleeds through, and, hence, will contribute to the blue primary.

The lasers which partially generate yellow light, need to be calibrated such that the phosphor light is linearized over dimming levels. As the wavelength conversion element such as a phosphor can or does behaves non-linearly, this implies that the resulting bleeding of blue non-converted laser light is non-linear over dimming levels. By suitably determining the driving of the other blue lasers, which are not directed to the phosphor, this non-linearity can be compensated for, such that the complete blue light generated by all lasers does behave linearly over dimming.

Figure 13:
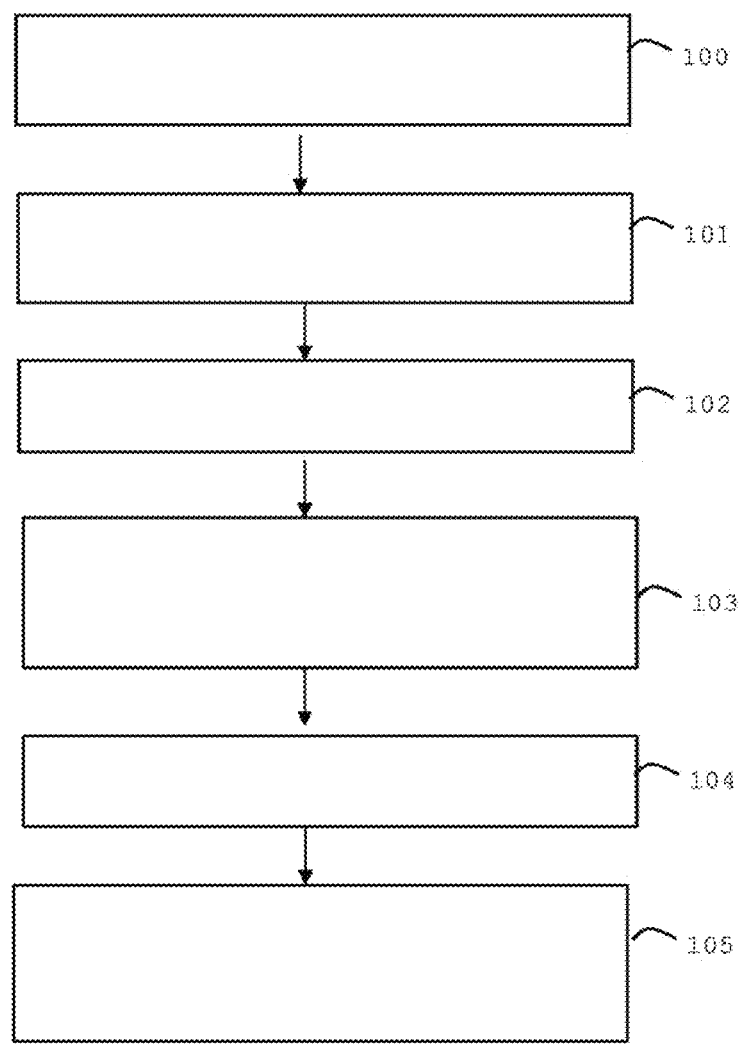
FIG. 13 shows a flowchart of an embodiment of the present invention comprising whitepoint correction using alpha factors.

FIG. 13 shows a flow chart of steps for implementing whitepoint correction optionally when a projector is being used in the field. In step 100 a calibration is performed as described above with respect to FIG. 7 as steps 30 to 37. In step 101, the means for setting a desired relative light output value or dimming level is set such as a slider is set to the desired brightness value and output white light. The light source controller can instruct the projector to output red, green and blue light. A white image can then be generated by the light modulator. In step 102, the tristimulus values of the light can be measured. In step 103, the tristimulus values of the primary light beams can be derived, and these can be used to calculate the alpha factors in step 104. Then each individual light source driving current can be adapted with its respective alpha factor in step 105.

Figure 15:
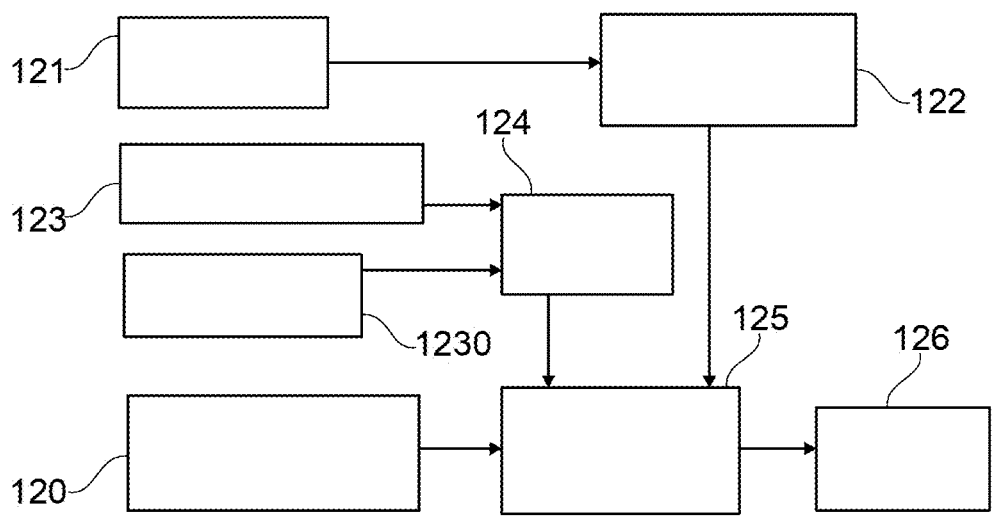
FIG. 15 shows a block diagram of an embodiment of the present invention comprising whitepoint correction using alpha factors.

FIG. 15 shows an overview of the whitepoint correction that can be used in the factory- or in the field calibration. The setting of the means for setting a desired relative light output value or dimming level such as the slider setting (dimming level) 120, the ambient temperature 121, and the whitepoint target values are input for the correction. It is assumed that linearized LUTs 122 already exist, and optionally a new field calibration can be made with the ambient temperature. The alpha factors 124 can be calculated by using the ambient temperature 121 and the whitepoint target 123 and the measured chromaticity 1230. The light source controller 125 can then receive the overall desired brightness setting for all light sources from the slider setting or dimming level 120, and the individual dimming levels in the alpha factors 124 for obtaining the whitepoint target, and the driving currents can be updated and provided to the laser sources 126.

FIG. 16 shows an overview of embodiments of the present invention implemented on a laser imaging projector.

The means for setting a desired relative light output value or dimming level between 0, 5, 15 or 30% and 100% such as slider 120 can be located at an operator user interface 140, e.g. an electronic control panel or a digital display. The tristimulus target 1231 and the measured tristimulus values 1230 can also be provided via the user interface 140. The settings of the means for setting a desired relative light output value or dimming level such as the slider settings and the tristimulus target 1231 and the measured tristimulus values 1230 can be provided to the Laser Control Board (LCB) 130 where the alpha factors 124 can be calculated. The LCB 130 can have means for measuring and storing the ambient temperature 121.

For an RGB projector with direct laser light in the three primary colours RGB, the red, green and blue primaries can be individually controlled to reach a destination whitepoint by controlling the individual laser light sources.

For a phosphor based projector, the red primary can be composed of red phosphor light obtained from a wavelength conversion element, as well as direct red laser light from a red laser, to reach a saturation of red. So, when changing brightness the wavelength conversion elements such as a phosphor and laser red light should be driven proportionally, in order to maintain the red saturation. The blue/yellow balance can improved, by taking into consideration that the desired whitepoint should not be reached. Instead, by doing a combination of alpha factor correction and electronic correction at the spatial light modulator (DMD) level, the target whitepoint can be reached with minimal compromises. This combination is done by calculating the required correction on the red green and blue primaries, and by applying the minimum correction of red and green to the lasers generating yellow and red light. The required correction for blue can be applied directly. The remaining correction can be done by the electronic spatial light modulator (DMD) correction.

If there is bleed through on the phosphor based light sources, e.g. some blue light bleeds through the phosphors, the driving of the blue lasers will need to adapted suitably, to cope with this effect. Quantum dots may be used as the wavelength conversion element and quantum dots can allow bleeding of the excitation light such as blue laser light through the quantum dots without conversion. The total blue light generated as the blue primary will partially comprise or consist of blue light generated directly by blue lasers, and partially of light which is directed towards the phosphor, but which bleeds through, and, hence, will contribute to the blue primary.

The lasers which partially generate yellow light, need to be calibrated such that the phosphor light is linearized over dimming levels. As the wavelength conversion element such as a phosphor can or does behaves non-linearly, this implies that the resulting bleeding of blue non-converted laser light is non-linear over dimming levels. By suitably determining the driving of the other blue lasers, which are not directed to the phosphor, this non-linearity can be compensated for, such that the complete blue light generated by all lasers does behave linearly over dimming.

The Cooling Control Unit CCU 133 can comprise means for cooling 134, for example peltier elements. The CCU 133 can receive the ambient temperature from the LCB 130.

The light source controller or Laser Driving Module (LDM) 125 can receive input from the LCB 130, e.g. the alpha factors 124 and the ambient temperature 121. The LDM 125 can calculate the driving current values that provides a predictable (e.g. linear) output as a function of brightness 131, for a reference temperature. Step 132 in LDM 125: the driving current values can be corrected for the difference between the ambient temperature and the reference temperature (ROPT).

The laser plate 135 can then receive the corrected driving current values from the LDM 125.

Accordingly, FIG. 16 can be adapted to provide a system according to embodiments of the present invention that includes light sources such as solid state sources of which lasers are one preferred type and means for setting a desired relative light output value or dimming level between 0, 5, 15 or 30% and 100% such as a slider. One or more LUT can be included. The system may also comprise means for temperature control. The means for temperature control can include cooling and/or optionally heating. The means for cooling can be peltier elements or for example cooling fans. The system may also have a transmissive or reflective spatial light modulator such as a DMD or LCOS device.

The system may include a light source controller that drives the light sources with the input currents related to a slider setting. The light source controller can be adapted to instruct the light sources to output the primary colours such as red, green and blue light. The system is adapted to generate an image by using the spatial light modulator and this image can be displayed. The system may also include an external image sensor that is adapted to detect the at least one tristimulus value of the light displayed.

The projector can be adapted so that any dependencies on the ambient temperature are controlled using the internal light sensor. Temperature scaling factors can be checked and updated over time. For RGB laser sources, the scaling corrections for the green and blue laser sources are minor compared to the correction for the red laser source. The main focus can then be on the correction performed on the red laser sources. In order to deal with an altering of the relation e.g. significantly over time, it is possible to redo the calibration at different light source operation temperatures by altering the settings of the internal cooling system (e.g. peltier elements or cooling fans).

The internal colour sensor of the projector can be used to determine values for the LUTs for the different lasers. A colour sensor can be selected that can measure the tristimulus values XYZ. The sensor can comprise filters that approximate XYZ tristimulus responses. The procedure can be run automatically without need for operator interaction.

The internal colour sensor can be located before (i.e. upstream of) the light modulator so that it detects the light from the light sources (and not from the light modulator). During measurement, each light source can be switched on while the other light sources are turned off. Between each measurement, all the light sources can be turned on, e.g. in order to stabilize them and bring them to a similar state. The internal sensor may only measure an approximate chromaticity. The procedure can be repeated for different slider settings using the same reference temperature T[ref2].

The method for the preparation of light sources having at least one laser and a wavelength conversion element or banks of lasers with at least one bank having a laser and a wavelength conversion element e.g. as used in laser phosphor based projectors, is largely the same as for direct laser light projectors with the following modifications.

These modified steps relate to the way that the laser banks are enabled/switched to be measured:

As described above, laser banks can be gauged by enabling the laser bank under test, and disabling all others:

If at least one has been fulfilled, the laser bank is enabled to be measured in step 62 of FIG. 7.

The above description comprises the step of measuring a laser bank by enabling it, and disabling all the other laser banks, such that only the specific laser bank is being measured.

In the case of laser phosphor projectors, blue lasers can be used to generate direct blue light, and other blue lasers can be used to generate yellow phosphor light. Additionally, red lasers can be used to improve the saturation of the red primary. For the calibration method, the distinction is made between the laser banks which are used to excite the phosphor, and the laser banks which are generating direct laser light. In the case of lasers generating direct laser light, the previously described method can be maintained. For the banks generating light from a wavelength conversion element such as a phosphor, the method is altered:

For each driving setting, a reference measurement is taken, by enabling all lasers in the laser banks.

Each laser bank which generates phosphor light is measured sequentially, by performing a measurement while this laser bank is disabled and all the other laser banks are still enabled.

The contribution for each bank is than obtained by calculating the differences between the reference measurement, and the measurements per disabled bank.

The obtained contributions per laser bank are then scaled, such that the sum of the contributions of all laser banks is equal to the reference measurement.

This change in procedure is introduced because the phosphor based laser light sources behaves non-linearly. At higher impinging blue light levels, a relatively lower amount of light is phosphor-converted, compared lower impinging blue light levels. By disabling single banks, the contribution of that particular bank is properly assessed at the corresponding phosphor operating regime.

In case the light sources are laser banks the laser light sources are arranged in these laser banks per colour. Each laser bank can be calibrated individually or all laser banks of the same color, can be simultaneously characterized. The response of each laser bank can differ, so calibrating them individually can help to obtain a better result. For the blue banks, the measured Z signal will be linked to the applied blue current, for the green banks the measured Y signal will be linked to the green current, and for the red banks, the X signal will be linked to the red driving current.

Temperature corrections can be determined by measurements. For example, a projector can be placed inside a climate chamber and a spectrometer can measure the emitted light spectra through a transparent window of the climate chamber. The spectrometer can be located outside the climate chamber in order to keep the spectrometer from being influenced by temperature changes during the measurements. Any window influence can be compensated for.

Both a factory- and/or an in the field calibration are disclosed. The setting of the means for setting a desired relative light output value or dimming level between 0, 5, 15 or 30% and 100% such as the slider setting (e.g. dimming level), the ambient temperature, and the colour point such as whitepoint target values are input for the correction. It is assumed that linearized LUTs are available, and optionally a new field calibration can be made with the ambient temperature. Alpha factors can be calculated by using the ambient temperature and the colour point such as whitepoint target and the measured chromaticity. The light source controller can then receive the overall desired brightness setting for all light sources from the slider setting or dimming level, and the individual dimming levels in the alpha factors for obtaining the color point or whitepoint target, and the driving currents can be updated and provided to the laser sources.

The means for setting a desired relative light output value or dimming level between 0, 5, 15 or 30% and 100% such as the slider 120 can be located at an operator user interface, e.g. an electronic control panel or a digital display. The tristimulus target and the measured tristimulus values can also be provided via the user interface. The settings of the means for setting a desired relative light output value or dimming level between 0, 5, 15 or 30% and 100% such as the slider settings and the tristimulus target 1231 and the measured tristimulus values can be provided to the Laser Control Board (LCB) 130 where the alpha factors 124 can be calculated. The LCB can have means for measuring and storing the ambient temperature.

The Cooling Control Unit CCU can comprises means for cooling, for example peltier elements. The CCU can receive the ambient temperature from the LCB.

The light source controller or Laser Driving Module (LDM) can receive input from the LCB, e.g. the alpha factors 124 and the ambient temperature. The LDM can calculate the driving current values that provides a predictable (e.g. linear) output as a function of brightness, for a reference temperature. The driving current values can be corrected for the difference between the ambient temperature and the reference temperature. A laser plate can then receive the corrected driving current values from the LDM.

A processor or a processing means either as a standalone device or embedded in a subsystem or other device can be adapted to carry out methods according to embodiments of the present invention as well as to assist in implementing a system according to any embodiment of the present invention. The present invention can use a processing engine being adapted to carry out functions. The processing engine preferably has processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

A processing means or processor may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions of any of the methods of the present invention, e.g. as itemised below when the software is loaded onto an electronic device such as controller and executed on one or more processing engines such as microprocessors, ASIC's, FPGA's etc. Hence, a processing means or processor for use with any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system such as Windows™ supplied by Microsoft Corp, USA, Linux, Android or similar. The computer system can include a main memory, preferably random-access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.:

Any of the detailed functions of a method for correcting driving currents for a multiple of primary light sources in an imaging system according to any of the features as discussed herein.

Any of the detailed functions of methods relating to a factory calibration as particularly defined in any of the features as discussed herein, either singly and/or in groups.

Any of the detailed functions of methods relating to a field calibration or a field re-calibration, as particularly defined herein, either singly and/or in groups.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid-state memory such as a USB flash memory, a ROM, etc.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention.

Calculations of the Alpha Factors

Approximate chromaticities of red, green and blue primaries:

These are predetermined chromaticities for red, green and blue. They depend mainly on the chosen lasers in the optical design of the projector. Note that there can be slight variations between chromaticities of individual lasers of a specific type, but many lasers are used in the designs, reducing the combined variation. There can of course be other reasons for variations, such as differences between different batches of lasers, and the tristimulus values can also drift over time, due to aging of the lasers. Yet, generally speaking, the resulting error is expected to be small. These are possible chromaticities of the lasers used in the design:

$$xr = 0.7165, yr = 0.2825, xg = 0.1075$$
$$yg = 0.8247, xb = 0.1318, yb = 0.0364$$

Note that this is an example, for a particular design using other lasers, the values can be measured or retrieved from datasheets The targeted whitepoint, for example DCI: xw=0.314, yw=0.351

Calculate factors to reach the whitepoint target (e.g. the DCI whitepoint)

Using the formulas below, the required scaling factors for the red, green and blue components are calculated. When using these scaling factors, on the red, green and blue linearized laser responses, DCI should be reached.

$$alpha = -yr *$$
$$((xb - xw) * (yg - yw) - (xg - xw) * (yb - yw)) / (yb * (yg * (xr - xw) -$$
$$yr * (xg - xw) + yw * (xg - xw) - yw * (xr - xw)))$$
$$beta = yg * ((xb - xw) * (yr - yw) - (xr - xw) * (yb - yw)) / (yb *$$
$$(yg * (xr - xw) - yr * (xg - xw) + yw * (xg - xw) - yw * (xr - xw)))$$

gamma=1
target_factors=[alpha,beta,gamma]
target_factors=divide(target_factors,max(target_factors))
I.e. normalize the target factors by dividing them by the maximum of alpha, beta and gamma.
Measured Whitepoint:

This is the actual measured whitepoint of the projector under test.

xw_measured, yw_measured.
Calculate Factors which Render the Measured Whitepoint:

This is the same formula as the one used above, but applied to the measured whitepoint.

$$alpha = -yr * ((xb - \text{xw\_measured}) * (yg - \text{yw\_measured}) -$$
$$(xg - \text{xw\_measured}) * (yb - \text{yw\_measured})) /$$
$$(yb * (xr - \text{xw\_measured}) - yr * (xg - \text{xw\_measured}) +$$
$$\text{yw\_measured} * (xg - \text{xw\_measured}) -$$
$$\text{yw\_measured} * (xr - \text{xw\_measured})))$$
$$beta = -yg * ((xb - \text{xw\_measured}) * (yr - \text{yw\_measured}) -$$
$$(xr - \text{xw\_measured}) * (yb - \text{yw\_measured})) /$$
$$(yb * (yg * (xr - \text{xw\_measured}) - yr * (xg - \text{xw\_measured}) +$$
$$\text{yw\_measured} * (xg - \text{xw\_measured}) -$$
$$\text{yw\_measured} * (xr - \text{xw\_measured})))$$

gamma=1
measured_factors=[alpha,beta,gamma]
measured_factors=divide(measured_factors,max(measured_factors))
Calculate Alpha Factors:

Obtain the suitable alpha factors. These factors make sure that the desired whitepoint is reached, given the measured whitepoint. This can be done mathematically by dividing the factors that render the target by the factors that render the measured whitepoint.

alpha_correction_factors=divide(DCI_factors,measured_factors)
norm_correction_factors=divide(alpha_correction_factors,max(alpha_correction_factors)).

For an RGB projector with direct laser light in the three primary colours RGB, the red, green and blue primaries can be individually controlled to reach a destination whitepoint by controlling the individual laser light sources For a phosphor based projector, the red primary can be composed of red phosphor light obtained from a wavelength conversion element, as well as direct red laser light from a red laser, to reach a saturation of red. So, when changing brightness the wavelength conversion elements such as a phosphor and laser red light should be driven proportionally, in order to maintain the red saturation. The blue/yellow balance can improved, by taking into consideration that the desired whitepoint should not be reached. Instead, by doing a combination of alpha factor correction and electronic correction at the spatial light modulator (DMD) level, the target whitepoint can be reached with minimal compromises. This combination is done by calculating the required correction on the red green and blue primaries, and by applying the minimum correction of red and green to the lasers generating yellow and red light. The required correction for blue can be applied directly. The remaining correction can be done by the electronic spatial light modulator (DMD) correction.

If there is bleed through on the phosphor based light sources, e.g. some blue light bleeds through the phosphors, the driving of the blue lasers will need to adapted suitably, to cope with this effect. Quantum dots may be used as the wavelength conversion element and quantum dots can allow bleeding of the excitation light such as blue laser light through the quantum dots without conversion. The total blue light generated as the blue primary will partially comprise or consist of blue light generated directly by blue lasers, and partially of light which is directed towards the phosphor, but which bleeds through, and, hence, will contribute to the blue primary.

The lasers which partially generate yellow light, need to be calibrated such that the phosphor light is linearized over dimming levels. As the wavelength conversion element such as a phosphor can or does behaves non-linearly, this implies that the resulting bleeding of blue non-converted laser light is non-linear over dimming levels. By suitably determining the driving of the other blue lasers, which are not directed to the phosphor, this non-linearity can be compensated for, such that the complete blue light generated by all lasers does behave linearly over dimming.

The invention claimed is:

1. A method for correcting driving currents to reach a color point target for a multiple of primary colour light sources in an imaging system having a light source controller, the method comprising the steps of:
    defining a color point target,
    obtaining a measured ambient temperature,
    obtaining tristimulus values of the light from the primary colour light sources,
    providing initial driving current values which are incoming driving current values of the light sources to the light source controller, wherein the initial driving current values are provided for a reference ambient temperature,
    for each of the light sources:
    calculating driving current values for the light sources as a function of at least one of the tristimulus values of the light sources, at the reference ambient temperature,
    adapting the driving current values based on the difference between the measured ambient temperature and the reference ambient temperature,
    correcting the driving current values with alpha factors, wherein the alpha factors are the dimming levels for each light source for reaching the color point target, and which depend on a relation between the obtained tristimulus values and the color point target, and the function of the at least one of the tristimulus values,
    and applying corrected driving current values which are outgoing driving current values to the primary colour light sources.

2. The method of claim 1, wherein a slider setting is used to set a light output value or a dimming level to a level between 1 and 100%.

3. The method of claim 2, further comprising driving the light sources with currents related to the slider setting.

4. The method of claim 1, wherein, for a displayed image, an external image sensor detects tristimulus values of the displayed image.

5. The method of claim 4, wherein expressions for the driving current values for primary colour (RGB) driving current values are defined and fitted to the measured tristimulus values.

6. The method of claim 5 in which the primary colour (RGB) driving current values are fitted as follows:
    establishing a polynomial expression for the driving currents, wherein the polynomial expression is optionally of the second degree (I[red], I[green] and I[blue]), and
    fitting the polynomials to the measured tristimulus values, Xr, Yg and Zb, i.e. Ired to Xr, Ig to Yg and Ib to Zb and updating LUT values with the fitted curves.

7. The method of claim 1, wherein the driving current at a temperature T[1] is obtained by multiplying a reference driving current at the reference ambient temperature, with a scaling factor for the driving current at the temperature T[1].

8. The method of claim 5, wherein a fitted driving current curve for the light sources of the same color differs from a neighbouring driving current curve for the light sources of another color, with a constant scaling value.

9. The method of claim 7, wherein, if input driving currents to output behaviour of a light source at a reference temperature T[ref] are known and described by a LUT, and a scaling factor for temperature T[1] is established, the behaviour at temperature T[1] can be corrected by multiplying the LUT values with the scaling factor of a scaling factor function for temperature T[1].

10. The method of claim 9, wherein the same scaling factor function is used for the driving currents for all light sources of the same color so that scaling factor values are applied to the values of the LUT.

11. A method for carrying out a factory calibration, the calibration method comprising:
    LUT values obtainable from the outcome of method steps defined in claim 6 are selected as initial values for performing a factory calibration.

12. The method of claim 11, wherein a slider setting is set a light output level or a dimming level to a first value, between 0 and 100%, and a reference temperature T[ref1] of an initial characterization is chosen from the range 5° to 50° C.

13. The method of claim 12, wherein a LUT[ref1] is uploaded to the light source controller, wherein the LUT [ref1] is valid for the reference temperature T[ref1].

14. The method of claim 13, wherein a temperature T[m] is measured.

15. The method of claim 14, wherein a driving current from LUT[ref1] is corrected with a scaling factor for temperature T[m].

16. A method comprising a field calibration or a field re-calibration, the method optionally comprising the method of claim 1.

17. The method of claim 16, wherein for a re-calibration of a projector in the field, an internal color sensor of the projector is used to determine values for LUTs for different lasers.

18. A non-transitory machine readable signal storage means storing a computer program product comprising software which, when executed on a processor implements the method of claim 1.

19. A system for correcting laser driving currents to reach a color point target for a multiple of primary colour light sources in an imaging system having a light source controller, comprising:
    means for defining a color point target,
    means for receiving a measured ambient temperature,
    means for receiving tristimulus values of the light from the primary colour light sources,
    means for providing initial laser driving current values, which are incoming laser driving current values of the light sources to the light source controller, wherein the initial laser driving current values are provided for a reference ambient temperature,
    and for each of the light sources:
    means for obtaining current conversion values between incoming laser driving currents and outgoing laser driving currents; wherein the light sources are adapted to receive the outgoing laser driving currents,
    means for calculating the outgoing laser driving current values for the light sources as a function of at least one of the tristimulus values of the light sources, at the reference ambient temperature based on the incoming laser driving current values,
    means for adapting the laser driving current values based on the difference between the measured ambient temperature and the reference ambient temperature,
    means for correcting the laser driving current values with alpha factors, wherein the alpha factors are the dimming levels for each light source for reaching the color point target,
    and which depend on a relation between the obtained tristimulus values and the color point target, and the function of the at least one of the tristimulus values,
    and means for applying corrected laser driving current values as outgoing laser driving current values to the primary colour light sources.

20. A system for correcting driving currents to reach a color point target for a multiple of primary colour light sources in an imaging system having a light source controller, comprising:
    means for defining a color point target,
    means for receiving a measured ambient temperature,
    means for receiving tristimulus values of the light from the primary light sources,
    means for providing initial driving current values of the light sources to the light source controller, wherein the initial driving current values are provided for a reference ambient temperature,
    and for each of the light sources:
    means for calculating driving current values for the light sources as a function of at least one of the tristimulus values of the light sources, at the reference ambient temperature,
    means for adapting the driving current values based on the difference between the measured ambient temperature and the reference ambient temperature,
    means for correcting the driving current values with alpha factors, wherein the alpha factors are the dimming levels for each light source for reaching the color point target,
    and which depend on a relation between the obtained tristimulus values and the color point target, and the function of the at least one of the tristimulus values,
    and means for applying corrected driving current values to the primary light sources,
    and further comprising a projector adapted so that any dependencies on the ambient temperature are controlled using an internal light sensor.

* * * * *